US011015976B2

United States Patent
Liu et al.

(10) Patent No.: US 11,015,976 B2
(45) Date of Patent: May 25, 2021

(54) METHOD FOR CONSTRUCTING MESHED MODEL AND DISCRETE CHROMATOGRAPHY OF EIGHT-ELEMENT PRIMARY COLOR HSB FULL COLOR GAMUT COLOR SPACE

(71) Applicant: YUYUE HOME TEXTILE CO., LTD., Binzhou (CN)

(72) Inventors: Yuexing Liu, Binzhou (CN); Yuan Xue, Binzhou (CN); Guoqing Zhang, Binzhou (CN); Yuping Wang, Binzhou (CN); Zundong Liu, Binzhou (CN); Zhichao Gao, Binzhou (CN); Kailing Chen, Binzhou (CN); Lei Zhang, Binzhou (CN)

(73) Assignee: YUYUE HOME TEXTILE CO., LTD., Binzhou (CN)

( * ) Notice: Subject to any disclaimer, the term of this patent is extended or adjusted under 35 U.S.C. 154(b) by 13 days.

(21) Appl. No.: 16/808,426

(22) Filed: Mar. 4, 2020

(65) Prior Publication Data

US 2021/0048343 A1 Feb. 18, 2021

Related U.S. Application Data

(63) Continuation of application No. PCT/CN2019/115237, filed on Nov. 4, 2019.

(30) Foreign Application Priority Data

Aug. 14, 2019 (CN) .......................... 201910747480.0

(51) Int. Cl.
*G01J 3/46* (2006.01)
*G01J 3/52* (2006.01)

(52) U.S. Cl.
CPC ............... *G01J 3/462* (2013.01); *G01J 3/463* (2013.01); *G01J 3/52* (2013.01); *G01J 2003/466* (2013.01); *G01J 2003/467* (2013.01)

(58) Field of Classification Search
CPC .... G01J 3/462; G01J 3/463; G01J 3/52; G01J 2003/466; G01J 2003/467
See application file for complete search history.

(56) References Cited

U.S. PATENT DOCUMENTS

2009/0238456 A1*  9/2009  Fukasawa ............. G06T 11/001
                                                                        382/167

FOREIGN PATENT DOCUMENTS

| CN | 104601858 A | 5/2015 |
| CN | 106817811 A | 6/2017 |
| CN | 108962183 A | 12/2018 |
| CN | 110073651 A | 7/2019 |

* cited by examiner

*Primary Examiner* — Jamil Ahmed
(74) *Attorney, Agent, or Firm* — Bayramoglu Law Offices LLC

(57) ABSTRACT

A method for constructing a meshed model and a discrete chromatography of eight primary color HSB color space is provided. By a meshed digital model and a discrete algorithm of color space, the color value and the color distribution in any point, line, surface and space area in the HSB color space can be quickly obtained based on color values of eight primary colors and coordinate values of mesh points in the HSB color space, thereby (i) realizing the full color gamut discrete chromatography of the HSB color space, (ii) realizing the visualization of the full color gamut of the color space, and (iii) improving the work efficiency of color matching.

2 Claims, 2 Drawing Sheets

METHOD FOR CONSTRUCTING MESHED MODEL AND DISCRETE CHROMATOGRAPHY OF EIGHT-ELEMENT PRIMARY COLOR HSB FULL COLOR GAMUT COLOR SPACE

CROSS REFERENCE TO THE RELATED APPLICATIONS

This application is the continuation application of International Application No. PCT/CN2019/115237, filed on Nov. 4, 2019, which is based upon and claims priority to Chinese Patent Application No. 201910747480.0, filed on Aug. 14, 2019, the entire contents of which are incorporated herein by reference.

TECHNICAL FIELD

The present disclosure relates to a method for constructing a meshed model and a discrete chromatography of eight primary color HSB color space, and belongs to the technical field of color control for dyeing materials, coatings and inks in the textile and printing industries.

BACKGROUND

The HSB (Hue, Saturation and Brightness) color space is a color scheme developed according to human vision, and is a three-dimensional space composition formed by systematically arranging and combining the three basic features (hue, brightness, and saturation) of color. Color is described by a hue ring with brightness as the vertical axis, saturation (chroma) as the horizontal axis, and tone as 0°-360°. The HSB color space can be described by a cone space model. There are more than 10 million kinds of tones based on color space. Ordinary people can distinguish color change of about 200 kinds of tones, 50 kinds of saturations, and 500-level grays, and color professionals can recognize about 300-400 kinds of tones.

The textile and printing industries often perform color control by the mixing of several colorants such as multi-element primary color dyeing materials, coatings and inks. In general, the color of a colorant mixture depends on the color and the mixing ratio and mixing method of each colorant. Under the premise that different colorants can be fully and uniformly mixed, it can be considered that the color of the mixed colorant mainly depends on the color of each colorant and the mixing ratio of each colorant. At present, the five primary colors of magenta, yellow, cyan, black, and white are basically used to construct the HSB color space. The tone control is performed by mixing red, yellow, cyan and other colorants, and the saturation control and the brightness control are performed by mixing black, white and other colorants.

The five primary colors of magenta, yellow, cyan, black, and white are at present used to construct the HSB color space and perform tone, saturation and brightness controls. This presents problems, such as low color yield and narrow chromatography. Existing color correction theories and methods are mainly based on qualitative descriptions, and have not established digital models and algorithms to give precise quantitative guidance. Since the meshing technology of colorant mixing color space is a key technology in the digital dyeing and digital printing industries, it is desireous to construct a color space with full chromatography, high fidelity and good reducibility by mixing colorants of multi-element primary color. Another area where existing color correction methods fall short is precision, that is, how to solve the color distribution in any point, line, surface and space area. It is thus a technical problem to improve the scheme. There has been varied success by constructing a meshed digital model and a discrete algorithm of color space. But basic problems of realizing the visible and intelligent color matching of the full color gamut colors in the color space remain.

SUMMARY

The technical problem to be solved by the present invention is to provide a method for constructing a meshed model and a discrete chromatography of eight primary color HSB color space. The color distribution in any point, line, surface and space area is solved by constructing a meshed digital model and a discrete algorithm of color space, which can provide an algorithm for realizing the visible and intelligent color matching of the full color gamut colors in the color space and improve the efficiency of color matching.

In order to solve the above technical problems, the present invention adopts the following technical solutions. The present invention provides a method for constructing a meshed model and a discrete chromatography of eight primary color HSB color space, and for realizing digital acquisition of colors in eight primary color HSB full color gamut color space based on mesh coordinates, which includes the following steps:

step A: constructing a 12-surface cone, selecting eight primary colors respectively corresponding to each vertex of the 12-surface cone, defining an upper end and a lower end of the 12-surface cone as vertex $O_1$ and vertex $O_2$, respectively, and for a middle periphery, defining vertices successively as vertex A, vertex B, vertex C, vertex D, vertex E, and vertex F;

then, for the 12-surface cone, obtaining ridgelines AB, BC, CD, DE, EF, FA, $O_1A$, $O_1B$, $O_1C$, $O_1D$, $O_1E$, $O_1F$, $AO_2$, $BO_2$, $CO_2$, $DO_2$, $EO_2$, $FO_2$, $O_1O_2$; obtaining triangles ACE, FDB, $ABO_1$, $BCO_1$, $CDO_1$, $DEO_1$, $EFO_1$, $FAO_1$, $ABO_2$, $BCO_2$, $CDO_2$, $DEO_2$, $EFO_2$, $FAO_2$, $O_1O_2A$, $O_1O_2B$, $O_1O_2C$, $O_1O_2D$, $O_1O_2E$, $O_1O_2F$; obtaining tetrahedrons $O_1O_2AB$, $O_1O_2BC$, $O_1O_2CD$, $O_1O_2DE$, $O_1O_2EF$, $O_1O_2FA$; obtaining hexahedrons $O_1O_2ACE$, $O_1O_2BDF$;

then proceeding to step B;

step B: for each ridgeline respectively, performing digital isometric division between two endpoints on the ridgeline to obtain (n−1) mesh points and coordinate values thereof, obtaining an interpolation function with mesh point coordinates as independent variables in combination with tristimulus values of primary color respectively corresponding to the two endpoints on the ridgeline, and obtaining tristimulus values of color of each mesh point based on mesh point coordinate values, wherein n*(n+1)/2 is a preset number of divisions;

for each tetrahedron respectively, performing mesh digital equal-part division in the tetrahedron to obtain $$\sum_{i=1}^{n+1} [i*(i+1)/2]$$

mesh points and coordinate values thereof, obtaining an interpolation function with mesh point coordinate values as independent variables in combination with tristimulus values of primary color respectively corresponding to four vertices on the tetrahedron, and obtaining tristimulus values of color corresponding to each mesh point based on mesh point coordinate values, wherein $$\sum_{i=1}^{n+1}[i*(i+1)/2]$$

is a preset number of divisions;

for each hexahedron respectively, performing mesh digital equal-part division in the hexahedron to obtain $$\sum_{i=1}^{n+1}[i*(i+1)]$$

mesh points and coordinate values thereof, obtaining an interpolation function with mesh point coordinate values as independent variables in combination with tristimulus values of primary color respectively corresponding to five vertices on the hexahedron, and obtaining tristimulus values of color corresponding to each mesh point based on mesh point coordinate values, wherein $$\sum_{i=1}^{n+1}[i*(i+1)]$$

is a preset number of divisions;

then proceeding to step C;

step C: according to tristimulus values and mesh point coordinate values of eight-element primary color respectively corresponding to each vertex on the 12-surface cone, in each ridgeline, each triangle, each tetrahedron, and each hexahedron on the 12-surface cone, obtaining a discrete distribution function of color tristimulus values with mesh point coordinates as independent variables, so as to realize the construction of the meshed model and the discrete chromatography of eight primary color HSB color space.

As a preferred solution of the present invention, in the step B, tristimulus values of color corresponding to each mesh point on each ridgeline are as follows:

$$r_i = \frac{n-i+1}{n}*R_\alpha + \frac{i-1}{n}*R_\beta$$

$$g_i = \frac{n-i+1}{n}*G_\alpha + \frac{i-1}{n}*G_\beta$$

$$b_i = \frac{n-i+1}{n}*B_\alpha + \frac{i-1}{n}*B_\beta$$

wherein $i \in \{1, 2, \ldots, n, n+1\}$, $r_i$, $g_i$, $b_i$ denote tristimulus values of color corresponding to each mesh point on a ridgeline, $R_\alpha$, $G_\alpha$, $B_\alpha$ denote tristimulus values of primary color $\alpha$ corresponding to one endpoint on the ridgeline, and $R_\beta$, $G_\beta$, $B_\beta$ denote tristimulus values of primary color $\beta$ corresponding to the other endpoint on the ridgeline.

As a preferred solution of the present invention, in the step B, tristimulus values of color corresponding to each mesh point in each triangle are as follows:

$$r_{\Delta i,j} = \frac{n-i-j+2}{n}*R_\alpha + \frac{i-1}{n}*R_\beta + \frac{j-1}{n}*R_\gamma$$

$$g_{\Delta i,j} = \frac{n-i-j+2}{n}*G_\alpha + \frac{i-1}{n}*G_\beta + \frac{j-1}{n}*G_\gamma$$

$$b_{\Delta i,j} = \frac{n-i-j+2}{n}*B_\alpha + \frac{i-1}{n}*B_\beta + \frac{j-1}{n}*B_\gamma$$

wherein i=1, 2, . . . n−1, n, n+1, j=1, 2, . . . n−1, n, n+1, i+j≤(n+2), $r_{\Delta i,j}$, $g_{\Delta i,j}$, $b_{\Delta i,j}$ denote tristimulus values of color corresponding to each mesh point in a triangle, $R_\alpha$, $G_\alpha$, $B_\alpha$ denote tristimulus values of primary color $\alpha$ corresponding to a first vertex of the triangle, $R_\beta$, $G_\beta$, $B_\beta$ denote tristimulus values of primary color $\beta$ corresponding to a second vertex of the triangle, and $R_\gamma$, $G_\gamma$, $B_\gamma$ denote tristimulus values of primary color $\gamma$ corresponding to a third vertex of the triangle.

As a preferred solution of the present invention, in the step B, tristimulus values of color corresponding to each mesh point in each tetrahedron are as follows:

$$r_{\#i,j,k} = \frac{n-i-j+2}{n}*R_\alpha + \frac{j-1}{n}*R_\beta + \frac{i-k}{n}*R_\gamma + \frac{k-1}{n}*R_\delta$$

$$g_{\#i,j,k} = \frac{n-i-j+2}{n}*G_\alpha + \frac{j-1}{n}*G_\beta + \frac{i-k}{n}*G_\gamma + \frac{k-1}{n}*G_\delta$$

$$b_{\#i,j,k} = \frac{n-i-j+2}{n}*B_\alpha + \frac{j-1}{n}*B_\beta + \frac{i-k}{n}*B_\gamma + \frac{k-1}{n}*B_\delta$$

wherein $i \in \{1, 2, \ldots, n, n+1\}$, $j \in \{1, 2, \ldots, n, n+1\}$, $k \in \{1, 2, \ldots, n, n+1\}$, i+j≤(n+2), i+k≤(n+2), k+j≤(n+2), $r_{\#i,j,k}$, $g_{\#i,j,k}$, $b_{\#i,j,k}$ denote tristimulus values of color corresponding to each mesh point in a tetrahedron, $R_\alpha$, $G_\alpha$, $B_\alpha$ denote tristimulus values of primary color $\alpha$ corresponding to a first vertex on the tetrahedron, $R_\beta$, $G_\beta$, $B_\beta$ denote tristimulus values of primary color $\beta$ corresponding to a second vertex on the tetrahedron, $R_\gamma$, $G_\gamma$, $B_\gamma$ denote tristimulus values of primary color $\gamma$ corresponding to a third vertex on the tetrahedron, and $R_\delta$, $G_\delta$, $B_\delta$ denote tristimulus values of primary color $\delta$ corresponding to a fourth vertex on the tetrahedron.

As a preferred solution of the present invention, in the Step B, tristimulus values of color corresponding to each mesh point in each hexahedron are as follows:

$$r_{i,j,k,l} =$$
$$\frac{n-i-j+2}{n}*R_\alpha + \frac{j-1}{n}*R_\beta + \frac{i-k}{n}*R_\gamma + \frac{k-1}{n}*R_\delta + \frac{l-1}{n}*R_\varepsilon$$

$$g_{i,j,k,l} = \frac{n-i-j+2}{n}*G_\alpha + \frac{j-1}{n}*G_\beta +$$
$$\frac{i-k}{n}*G_\gamma + \frac{k-1}{n}*G_\delta + \frac{l-1}{n}*G_\varepsilon$$

$$b_{i,j,k,l} = \frac{n-i-j+2}{n}*B_\alpha + \frac{j-1}{n}*B_\beta +$$
$$\frac{i-k}{n}*B_\gamma + \frac{k-1}{n}*B_\delta + \frac{l-1}{n}*B_\varepsilon$$

wherein $i \in \{1, 2, \ldots, n, n+1\}$, $j \in \{1, 2, \ldots, n, n+1\}$, $k \in \{1, 2, \ldots, n, n+1\}$, $l \in \{1, 2, \ldots, n, n+1\}$, i+j≤(n+2), i+k≤(n+2), i+l≤(n+2), j+k≤(n+2), j+l≤(n+2), k+l≤(n+2), i, j, k, l denote coordinates of hexahedron division mesh points, $r_{i,j,k,l}$, $g_{i,j,k,l}$, $b_{i,j,k,l}$ denote tristimulus values of color corresponding to each mesh point in a hexahedron, $R_\alpha$, $G_\alpha$, $B_\alpha$ denote tristimulus values of primary color $\alpha$ corresponding to a first endpoint on the hexahedron, $R_\beta$, $G_\beta$, $B_\beta$ denote tristimulus values of primary color β corresponding to a second endpoint on the hexahedron, $R_\gamma$, $G_\gamma$, $B_\gamma$ denote tristimulus values of primary color γ corresponding to a third endpoint on the hexahedron, $R_\delta$, $G_\delta$, $B_\delta$ denote tristimulus values of primary color δ corresponding to a fourth endpoint on the hexahedron, and $R_\epsilon$, $G_\epsilon$, $B_\epsilon$ denote tristimulus values of primary color ε corresponding to a fifth endpoint on the hexahedron.

As a preferred solution of the present invention, tristimulus values of color corresponding to each vertex on the 12-surface cone are as follows:

A(255, 0, 0), B(255, 255, 0), C(0, 255, 0), D(0, 255, 255), E(0, 0, 255), F(255, 0, 255), $O_1$ (255, 255, 255), $O_1$ (0, 0, 0);

based on n=10, acquisition of full color gamut discrete colors of eight primary color HSB color space is realized.

Compared with the prior art, by adopting the above technical solutions, the novel method for constructing a meshed model and a discrete chromatography of eight primary color HSB color space described in the present invention has the following technical effects.

(1) The present invention provides a method for constructing a meshed model and a discrete chromatography of eight primary color HSB color space. By a meshed digital model and a discrete algorithm of color space, the color value and the color distribution in any point, line, surface and space area in the HSB color space can be quickly obtained based on color values of eight primary colors and coordinate values of mesh points in the HSB color space, thereby (i) realizing the full color gamut discrete chromatography of the HSB color space, (ii) realizing the visualization of the full color gamut of the color space, and (iii) improving the work efficiency of color matching.

(2) The present invention provides a method for constructing a meshed model and a discrete chromatography of eight primary color HSB color space. The mesh points distributed in the full color gamut space directly show (i) serialized binary color gradation chromatography obtained by performing discrete mixing on two groups of different primary colors randomly selected from eight-element primary color, (ii) serialized ternary color gradation chromatography obtained by performing discrete mixing on three groups of different primary colors randomly selected from eight-element primary color, (iii) serialized quaternary color gradation chromatography obtained by performing discrete mixing on four groups of different primary colors randomly selected from eight-element primary color and (iv) serialized pentad color gradation chromatography obtained by performing discrete mixing on five groups of different primary colors randomly selected from eight-element primary color, which provides digital calculation method for deducing the change rule of mixed colors and innovating color design.

(3) The present invention provides a method for constructing a meshed model and a discrete chromatography of eight primary color HSB color space. The color model can be constructed by optimizing the type and the number of multi-element primary color according to the actual application needs, and meshed scale of the model can be optimized according to the accuracy requirements of discrete chromatography. When constructing a color model, the HSB(Hue-Saturation-Brightness)/HSV(Hue-Saturation-Value)/HSL(Hue-Saturation-Lightness)/HSI color models can be used, and the color models such as RGB (Red, Green and Blue), YUV/YIQ, CMYK (Cyan, Magenta, Yellow, and Black), CIE (Commission Internationale de l'Eclairage) can also be used.

(4) The present invention provides a method for constructing a meshed model and a discrete chromatography of eight primary color HSB color space, which can be applied to the mixing of coloured light, the mixing of colorant, and the space juxtaposition mixing of color fiber.

DETAILED DESCRIPTION OF THE EMBODIMENTS

The specific embodiments of the present invention are further described in detail below with reference to the accompanying drawings of the description.

Figure 1:
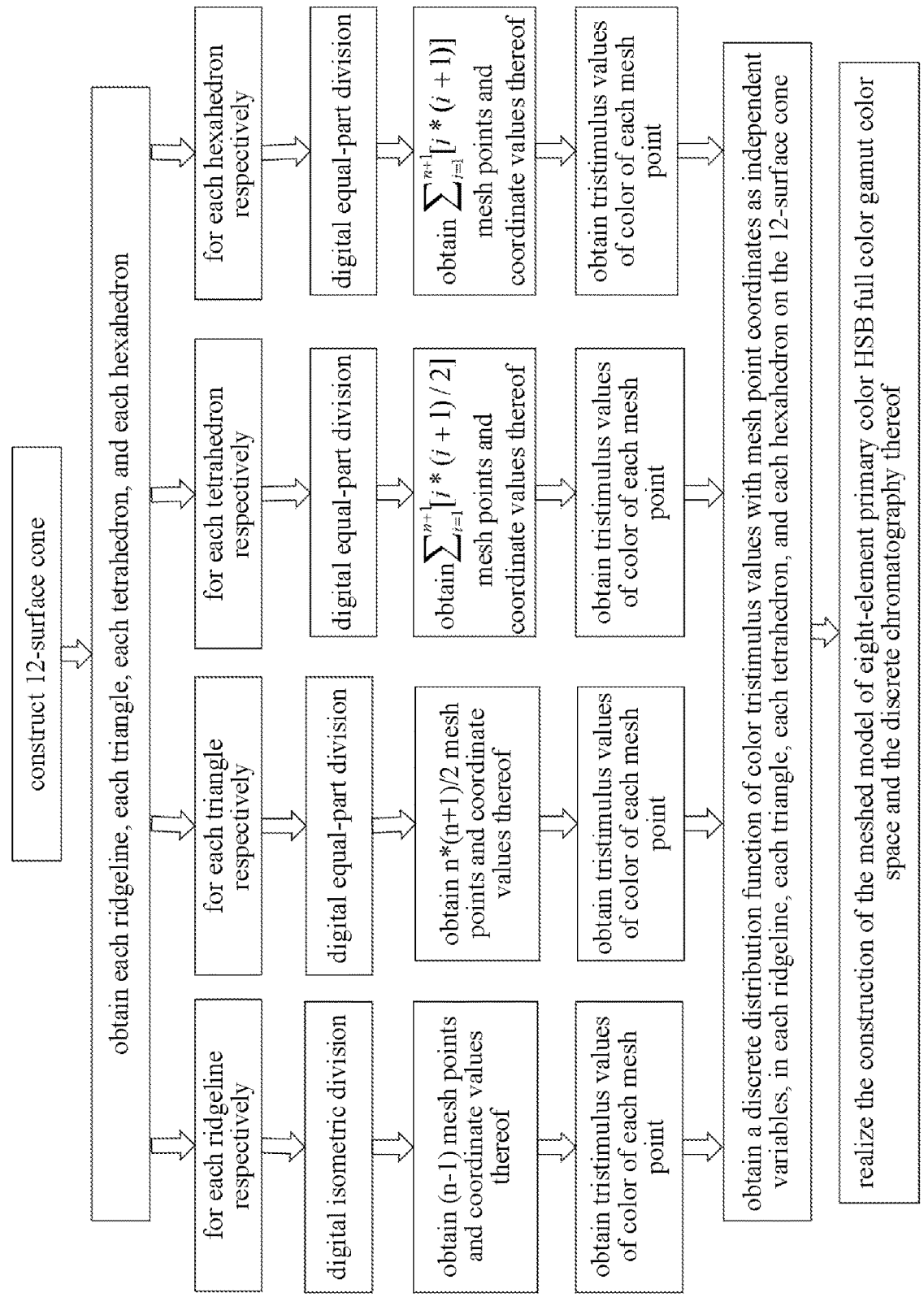
FIG. 1 is a schematic flow chart of a method for constructing a meshed model and a discrete chromatography of eight primary color HSB color space according to the present invention.

The present invention provides a method for constructing a meshed model and a discrete chromatography of eight primary color HSB color space, for realizing digital acquisition of colors in eight primary color HSB full color gamut color space based on mesh coordinates. In the actual application, eight primary colors of red, yellow, green, blue, cyan, magenta, black, and white are selected for implementation and application. As shown in FIG. 1, the method specifically includes the following steps.

Figure 2:
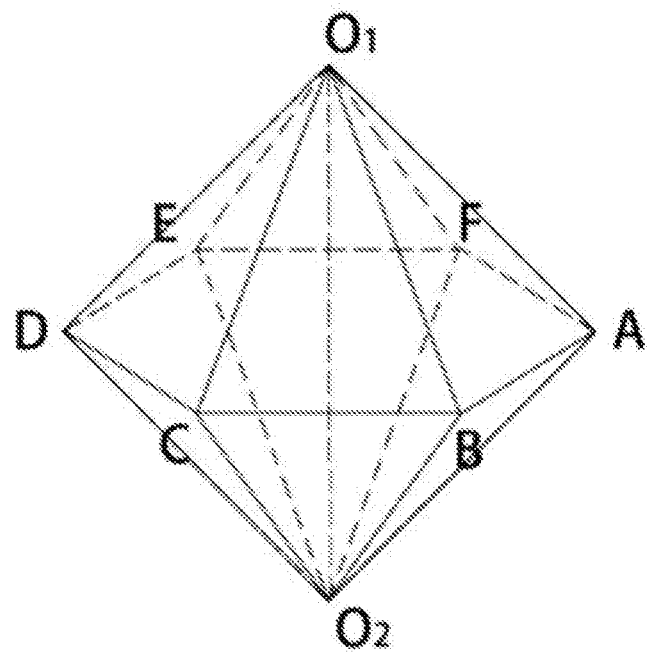
FIG. 2 is a schematic diagram of a 12-surface cone according to the present invention.
Figure 3:
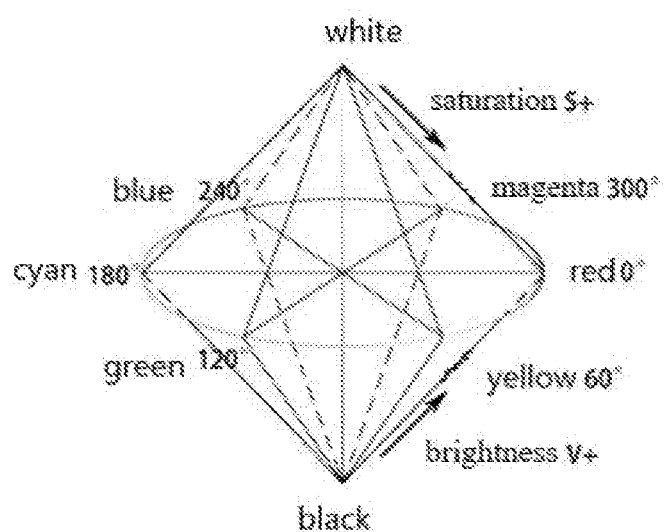
FIG. 3 is a schematic diagram of an embodiment of a 12-surface cone according to the present invention.

Step A: as shown in FIG. 2, a 12-surface cone is constructed. Eight primary colors are selected to respectively correspond to each vertex of the 12-surface cone. An upper end and a lower end of the 12-surface cone are defined as vertex $O_1$ and vertex $O_2$, respectively. For the middle periphery, vertices are successively defined as vertex A, vertex B, vertex C, vertex D, vertex E, and vertex F. As shown in FIG. 3, eight primary colors of red, yellow, green, blue, cyan, magenta, black, and white respectively correspond to each vertex. Wherein, RGB (Red, Green and Blue) values and HSB values of the eight primary colors are shown in Table 1, that is, A(255, 0, 0), B(255, 255, 0), C(0, 255, 0), D(0, 255, 255), E(0, 0, 255), F(255, 0, 255), $O_1$ (255, 255, 255), $O_1$ (0, 0, 0).

TABLE 1

| primary color | red | yellow | green | cyan | blue | magenta | white | black |
|---|---|---|---|---|---|---|---|---|
| R | 255, | 255, | 0, | 0, | 0, | 255, | 255, | 0, |
| G | 0, | 255, | 255, | 255, | 0, | 0, | 255, | 0, |
| B | 0 | 0 | 0 | 255 | 255 | 255 | 255 | 0 |

TABLE 1-continued

| primary color | red | yellow | green | cyan | blue | magenta | white | black |
|---|---|---|---|---|---|---|---|---|
| H | 0, | 60, | 120, | 180, | 240, | 300, | 0, | 0, |
| S | 100%, | 100%, | 100%, | 100%, | 100%, | 100%, | 0, | 0, |
| B | 0.5 | 0.5 | 0.5 | 0.5 | 0.5 | 0.5 | 1 | 0 |
| vertex | A | B | C | D | E | F | $O_1$ | $O_2$ |

Then, for the 12-surface cone, the following ridgelines are obtained: AB, BC, CD, DE, EF, FA, $O_1A$, $O_1B$, $O_1C$, $O_1D$, $O_1E$, $O_1F$, $AO_2$, $BO_2$, $CO_2$, $DO_2$, $EO_2$, $FO_2$, $O_1O_2$;

the following triangles are obtained: ACE, FDB, $ABO_1$, $BCO_1$, $CDO_1$, $DEO_1$, $EFO_1$, $FAO_1$, $ABO_2$, $BCO_2$, $CDO_2$, $DEO_2$, $EFO_2$, $FAO_2$, $O_1O_2A$, $O_1O_2B$, $O_1O_2C$, $O_1O_2D$, $O_1O_2E$, $O_1O_2F$;

the following tetrahedrons are obtained: $O_1O_2AB$, $O_1O_2BC$, $O_1O_2CD$, $O_1O_2DE$, $O_1O_2EF$, $O_1O_2FA$; and the following hexahedrons are obtained: $O_1O_2ACE$, $O_1O_2BDF$.

Then proceeding to Step B.

Step B: for each ridgeline respectively, digital isometric division is performed between two endpoints on the ridgeline to obtain (n−1) mesh points and coordinate values thereof. An interpolation function with mesh point coordinates as independent variables is obtained in combination with tristimulus values of primary color corresponding, respectively, to the two endpoints on the ridgeline, and tristimulus values of color corresponding to each mesh point are obtained based on mesh point coordinate values as follows:

$$r_i = \frac{n-i+1}{n} * R_\alpha + \frac{i-1}{n} * R_\beta$$

$$g_i = \frac{n-i+1}{n} * G_\alpha + \frac{i-1}{n} * G_\beta$$

$$b_i = \frac{n-i+1}{n} * B_\alpha + \frac{i-1}{n} * B_\beta$$

wherein, n is a preset number of divisions, $i \in \{1, 2, \ldots, n, n+1\}$, $r_i$, $g_i$, $b_i$ denote tristimulus values of color corresponding to each mesh point on a ridgeline, $R_\alpha$, $G_\alpha$, $B_\alpha$ denote tristimulus values of primary color α corresponding to one endpoint on the ridgeline, and $R_\beta$, $G_\beta$, $B_\beta$ denote tristimulus values of primary color β corresponding to the other endpoint on the ridgeline.

The tristimulus values of color of each mesh point on each ridgeline in eight primary color HSB color space are shown in Table 2.

TABLE 2

| No. | ridgeline | ridgeline endpoint RGB value | | ridgeline mesh point RGB value |
|---|---|---|---|---|
| 1 | $\overline{AB}$ | $a(R_a, G_a, B_a)$ | $b(R_b, G_b, B_b)$ | $r_{\overline{abi}} = \frac{n-i+1}{n} * R_a + \frac{i-1}{n} * R_b$ $g_{\overline{abi}} = \frac{n-i+1}{n} * G_a + \frac{i-1}{n} * G_b$ $r_{\overline{abi}} = \frac{n-i+1}{n} * B_a + \frac{i-1}{n} * B_b$ |
| 2 | $\overline{BC}$ | $b(R_b, G_b, B_b)$ | $c(R_c, G_c, B_c)$ | $r_{\overline{bci}} = \frac{n-i+1}{n} * R_a + \frac{i-1}{n} * R_b$ $g_{\overline{bci}} = \frac{n-i+1}{n} * G_a + \frac{i-1}{n} * G_b$ $r_{\overline{bci}} = \frac{n-i+1}{n} * B_a + \frac{i-1}{n} * B_b$ |
| 3 | $\overline{CD}$ | $c(R_c, G_c, B_c)$ | $d(R_d, G_d, B_d)$ | $r_{\overline{cdi}} = \frac{n-i+1}{n} * R_c + \frac{i-1}{n} * R_d$ $g_{\overline{cdi}} = \frac{n-i+1}{n} * G_c + \frac{i-1}{n} * G_d$ $r_{\overline{cdi}} = \frac{n-i+1}{n} * B_c + \frac{i-1}{n} * B_d$ |
| 4 | $\overline{DE}$ | $d(R_d, G_d, B_d)$ | $e(R_e, G_e, B_e)$ | $r_{\overline{dei}} = \frac{n-i+1}{n} * R_d + \frac{i-1}{n} * R_d$ $g_{\overline{dei}} = \frac{n-i+1}{n} * G_d + \frac{i-1}{n} * G_e$ $r_{\overline{dei}} = \frac{n-i+1}{n} * B_d + \frac{i-1}{n} * B_e$ |

TABLE 2-continued

| No. | ridgeline | ridgeline endpoint RGB value | | ridgeline mesh point RGB value |
|---|---|---|---|---|
| 5 | $\overline{EF}$ | $e(R_e, G_e, B_e)$ | $f(R_f, G_f, B_f)$ | $r_{\overline{ef}i} = \dfrac{n-i+1}{n} * R_e + \dfrac{i-1}{n} * R_f$ |
| | | | | $g_{\overline{ef}i} = \dfrac{n-i+1}{n} * G_e + \dfrac{i-1}{n} * G_f$ |
| | | | | $r_{\overline{ef}i} = \dfrac{n-i+1}{n} * B_e + \dfrac{i-1}{n} * B_f$ |
| 6 | $\overline{FA}$ | $f(R_f, G_f, B_f)$ | $a(R_a, G_a, B_a)$ | $r_{\overline{fa}i} = \dfrac{n-i+1}{n} * R_f + \dfrac{i-1}{n} * R_a$ |
| | | | | $g_{\overline{fa}i} = \dfrac{n-i+1}{n} * G_f + \dfrac{i-1}{n} * G_a$ |
| | | | | $r_{\overline{fa}i} = \dfrac{n-i+1}{n} * B_f + \dfrac{i-1}{n} * B_a$ |
| 7 | $\overline{O_1A}$ | $o1(R_{o1}, G_{o1}, B_{o1})$ | $a(R_a, G_a, B_a)$ | $r_{\overline{o1a}i} = \dfrac{n-i+1}{n} * R_{o1} + \dfrac{i-1}{n} * R_a$ |
| | | | | $g_{\overline{o1a}i} = \dfrac{n-i+1}{n} * G_{o1} + \dfrac{i-1}{n} * G_a$ |
| | | | | $r_{\overline{o1a}i} = \dfrac{n-i+1}{n} * B_{o1} + \dfrac{i-1}{n} * B_a$ |
| 8 | $\overline{O_1B}$ | $o1(R_{o1}, G_{o1}, B_{o1})$ | $b(R_b, G_b, B_b)$ | $r_{\overline{o1b}i} = \dfrac{n-i+1}{n} * R_{o1} + \dfrac{i-1}{n} * R_b$ |
| | | | | $g_{\overline{o1b}i} = \dfrac{n-i+1}{n} * G_{o1} + \dfrac{i-1}{n} * G_b$ |
| | | | | $r_{\overline{o1b}i} = \dfrac{n-i+1}{n} * B_{o1} + \dfrac{i-1}{n} * B_b$ |
| 9 | $\overline{O_1C}$ | $o1(R_{o1}, G_{o1}, B_{o1})$ | $c(R_c, G_c, B_c)$ | $r_{\overline{o1c}i} = \dfrac{n-i+1}{n} * R_{o1} + \dfrac{i-1}{n} * R_c$ |
| | | | | $g_{\overline{o1c}i} = \dfrac{n-i+1}{n} * G_{o1} + \dfrac{i-1}{n} * G_c$ |
| | | | | $10 r_{\overline{o1c}i} = \dfrac{n-i+1}{n} * B_{o1} + \dfrac{i-1}{n} * B_c$ |
| 10 | $\overline{O_1D}$ | $o1(R_{o1}, G_{o1}, B_{o1})$ | $d(R_d, G_d, B_d)$ | $r_{\overline{o1d}i} = \dfrac{n-i+1}{n} * R_{o1} + \dfrac{i-1}{n} * R_d$ |
| | | | | $g_{\overline{o1d}i} = \dfrac{n-i+1}{n} * G_{o1} + \dfrac{i-1}{n} * G_d$ |
| | | | | $r_{\overline{o1d}i} = \dfrac{n-i+1}{n} * B_{o1} + \dfrac{i-1}{n} * B_d$ |
| 11 | $\overline{O_1E}$ | $o1(R_{o1}, G_{o1}, B_{o1})$ | $e(R_e, G_e, B_e)$ | $r_{\overline{o1e}i} = \dfrac{n-i+1}{n} * R_{o1} + \dfrac{i-1}{n} * R_e$ |
| | | | | $g_{\overline{o1e}i} = \dfrac{n-i+1}{n} * G_{o1} + \dfrac{i-1}{n} * G_e$ |
| | | | | $r_{\overline{o1e}i} = \dfrac{n-i+1}{n} * B_{o1} + \dfrac{i-1}{n} * B_e$ |
| 12 | $\overline{O_1F}$ | $o1(R_{o1}, G_{o1}, B_{o1})$ | $f(R_f, G_f, B_f)$ | $r_{\overline{o1f}i} = \dfrac{n-i+1}{n} * R_{o1} + \dfrac{i-1}{n} * R_f$ |
| | | | | $g_{\overline{o1f}i} = \dfrac{n-i+1}{n} * G_{o1} + \dfrac{i-1}{n} * G_f$ |
| | | | | $r_{\overline{o1f}i} = \dfrac{n-i+1}{n} * B_{o1} + \dfrac{i-1}{n} * B_f$ |
| 13 | $\overline{O_2A}$ | $o2(R_{o2}, G_{o2}, B_{o2})$ | $a(R_a, G_a, B_a)$ | $r_{\overline{o2a}i} = \dfrac{n-i+1}{n} * R_{o2} + \dfrac{i-1}{n} * R_a$ |
| | | | | $g_{\overline{o2a}i} = \dfrac{n-i+1}{n} * G_{o2} + \dfrac{i-1}{n} * G_a$ |
| | | | | $r_{\overline{o2a}i} = \dfrac{n-i+1}{n} * B_{o2} + \dfrac{i-1}{n} * B_a$ |

TABLE 2-continued

| No. | ridgeline | ridgeline endpoint RGB value | | ridgeline mesh point RGB value |
|---|---|---|---|---|
| 14 | $\overline{O_2B}$ | o2($R_{o2}, G_{o2}, B_{o2}$) | b($R_b, G_b, B_b$) | $r_{\overline{o2ai}} = \frac{n-i+1}{n} * R_{o2} + \frac{i-1}{n} * R_b$ <br> $g_{\overline{o2ai}} = \frac{n-i+1}{n} * G_{o2} + \frac{i-1}{n} * G_b$ <br> $r_{\overline{o2ai}} = \frac{n-i+1}{n} * B_{o2} + \frac{i-1}{n} * B_b$ |
| 15 | $\overline{O_2C}$ | o2($R_{o2}, G_{o2}, B_{o2}$) | c($R_c, G_c, B_c$) | $r_{\overline{o2ai}} = \frac{n-i+1}{n} * R_{o2} + \frac{i-1}{n} * R_c$ <br> $g_{\overline{o2ai}} = \frac{n-i+1}{n} * G_{o2} + \frac{i-1}{n} * G_c$ <br> $r_{\overline{o2ai}} = \frac{n-i+1}{n} * B_{o2} + \frac{i-1}{n} * B_c$ |
| 16 | $\overline{O_2D}$ | o2($R_{o2}, G_{o2}, B_{o2}$) | d($R_d, G_d, B_d$) | $r_{\overline{o2ai}} = \frac{n-i+1}{n} * R_{o2} + \frac{i-1}{n} * R_d$ <br> $g_{\overline{o2ai}} = \frac{n-i+1}{n} * G_{o2} + \frac{i-1}{n} * G_d$ <br> $r_{\overline{o2ai}} = \frac{n-i+1}{n} * B_{o2} + \frac{i-1}{n} * B_d$ |
| 17 | $\overline{O_2E}$ | o2($R_{o2}, G_{o2}, B_{o2}$) | e($R_e, G_e, B_e$) | $r_{\overline{o2ai}} = \frac{n-i+1}{n} * R_{o2} + \frac{i-1}{n} * R_e$ <br> $g_{\overline{o2ai}} = \frac{n-i+1}{n} * G_{o2} + \frac{i-1}{n} * G_e$ <br> $r_{\overline{o2ai}} = \frac{n-i+1}{n} * B_{o2} + \frac{i-1}{n} * B_e$ |
| 18 | $\overline{O_2F}$ | o2($R_{o2}, G_{o2}, B_{o2}$) | f($R_f, G_f, B_f$) | $r_{\overline{o2ai}} = \frac{n-i+1}{n} * R_{o2} + \frac{i-1}{n} * R_f$ <br> $g_{\overline{o2ai}} = \frac{n-i+1}{n} * G_{o2} + \frac{i-1}{n} * G_f$ <br> $r_{\overline{o2ai}} = \frac{n-i+1}{n} * B_{o2} + \frac{i-1}{n} * B_f$ |
| 19 | $\overline{O_1O_2}$ | o1($R_{o1}, G_{o1}, B_{o1}$) | o2($R_{o2}, G_{o2}, B_{o2}$) | $r_{\overline{o1i}} = \frac{n-i+1}{n} * R_{o1} + \frac{i-1}{n} * R_{o2}$ <br> $g_{\overline{o1i}} = \frac{n-i+1}{n} * G_{o1} + \frac{i-1}{n} * G_{o2}$ <br> $r_{\overline{o1i}} = \frac{n-i+1}{n} * B_{o1} + \frac{i-1}{n} * B_{o2}$ |

For each triangle respectively, mesh digital equal-part division is performed in the triangle to obtain n*(n+1)/2 mesh points and coordinate values thereof. An interpolation function with mesh point coordinate values as independent variables is obtained in combination with tristimulus values of primary color respectively corresponding to three vertices on the triangle, and tristimulus values of color corresponding to each mesh point are obtained based on mesh point coordinate values as follows:

$$r_{\Delta i,j} = \frac{n-i-j+2}{n} * R_\alpha + \frac{i-1}{n} * R_\beta + \frac{j-1}{n} * R_\gamma$$

$$g_{\Delta i,j} = \frac{n-i-j+2}{n} * G_\alpha + \frac{i-1}{n} * G_\beta + \frac{j-1}{n} * G_\gamma$$

-continued $$b_{\Delta i,j} = \frac{n-i-j+2}{n} * B_\alpha + \frac{i-1}{n} * B_\beta + \frac{j-1}{n} * B_\gamma$$

wherein, n*(n+1)/2 is a preset number of divisions, i=1, 2, . . . n−1, n, n+1, j=1, 2, . . . n−1, n, n+1, i+j≤(n+2), $r_{\Delta i,j}$, $g_{\Delta i,j}$, $b_{\Delta i,j}$ denote tristimulus values of color corresponding to each mesh point in a triangle, $R_\alpha$, $G_\alpha$, $B_\alpha$ denote tristimulus values of primary color α corresponding to a first vertex of the triangle, $R_\beta$, $G_\beta$, $B_\beta$ denote tristimulus values of primary color β corresponding to a second vertex of the triangle, and $R_\gamma$, $G_\gamma$, $B_\gamma$ denote tristimulus values of primary color γ corresponding to a third vertex of the triangle.

The tristimulus values of color of each mesh point on each triangle in eight primary color HSB color space are shown in Table 3.

TABLE 3

| No. | triangle | triangle endpoint RGB value | triangle mesh point RGB value |
|---|---|---|---|
| 1 | $\triangle \overline{ABO_1}$ | $A(R_a, G_a, B_a)$ $B(R_b, G_b, B_b)$ $O1(R_{o1}, G_{o1}, B_{o1})$ | $r_{\triangle \overline{ABO_1}i,j} = \frac{n-i-j+2}{n}*R_a + \frac{i-1}{n}*R_b + \frac{j-1}{n}*R_{o1}$ $g_{\triangle \overline{ABO_1}i,j} = \frac{n-i-j+2}{n}*G_a + \frac{i-1}{n}*G_b + \frac{j-1}{n}*G_{o1}$ $b_{\triangle \overline{ABO_1}i,j} = \frac{n-i-j+2}{n}*B_a + \frac{i-1}{n}*B_b + \frac{j-1}{n}*B_{o1}$ |
| 2 | $\triangle \overline{BCO_1}$ | $B(R_b, G_b, B_b)$ $C(R_c, G_c, B_c)$ $O1(R_{o1}, G_{o1}, B_{o1})$ | $r_{\triangle \overline{BCO_1}i,j} = \frac{n-i-j+2}{n}*R_b + \frac{i-1}{n}*R_c + \frac{j-1}{n}*R_{o1}$ $g_{\triangle \overline{BCO_1}i,j} = \frac{n-i-j+2}{n}*G_B + \frac{i-1}{n}*G_C + \frac{j-1}{n}*G_{o1}$ $b_{\triangle \overline{BCO_1}i,j} = \frac{n-i-j+2}{n}*B_B + \frac{i-1}{n}*B_C + \frac{j-1}{n}*B_{o1}$ |
| 3 | $\triangle \overline{CDO_1}$ | $C(R_c, G_c, B_c)$ $D(R_d, G_d, B_d)$ $O1(R_{o1}, G_{o1}, B_{o1})$ | $r_{\triangle \overline{CDO_1}i,j} = \frac{n-i-j+2}{n}*R_c + \frac{i-1}{n}*R_d + \frac{j-1}{n}*R_{o1}$ $g_{\triangle \overline{CDO_1}i,j} = \frac{n-i-j+2}{n}*G_c + \frac{i-1}{n}*G_d + \frac{j-1}{n}*G_{o1}$ $b_{\triangle \overline{CDO_1}i,j} = \frac{n-i-j+2}{n}*B_c + \frac{i-1}{n}*B_d + \frac{j-1}{n}*B_{o1}$ |
| 4 | $\triangle \overline{DEO_1}$ | $D(R_d, G_d, B_d)$ $E(R_e, G_e, B_e)$ $O1(R_{o1}, G_{o1}, B_{o1})$ | $r_{\triangle \overline{DEO_1}i,j} = \frac{n-i-j+2}{n}*R_d + \frac{i-1}{n}*R_e + \frac{j-1}{n}*R_{o1}$ $g_{\triangle \overline{DEO_1}i,j} = \frac{n-i-j+2}{n}*G_d + \frac{i-1}{n}*G_e + \frac{j-1}{n}*G_{o1}$ $b_{\triangle \overline{DEO_1}i,j} = \frac{n-i-j+2}{n}*B_d + \frac{i-1}{n}*B_e + \frac{j-1}{n}*B_{o1}$ |
| 5 | $\triangle \overline{EFO_1}$ | $E(R_e, G_e, B_e)$ $F(R_f, G_f, B_f)$ $O1(R_{o1}, G_{o1}, B_{o1})$ | $r_{\triangle \overline{EFO_1}i,j} = \frac{n-i-j+2}{n}*R_e + \frac{i-1}{n}*R_f + \frac{j-1}{n}*R_{o1}$ $g_{\triangle \overline{EFO_1}i,j} = \frac{n-i-j+2}{n}*G_e + \frac{i-1}{n}*G_f + \frac{j-1}{n}*G_{o1}$ $b_{\triangle \overline{EFO_1}i,j} = \frac{n-i-j+2}{n}*B_e + \frac{i-1}{n}*B_f + \frac{j-1}{n}*B_{o1}$ |
| 6 | $\triangle \overline{FAO_1}$ | $F(R_f, G_f, B_f)$ $A(R_a, G_a, B_a)$ $O1(R_{o1}, G_{o1}, B_{o1})$ | $r_{\triangle \overline{FAO_1}i,j} = \frac{n-i-j+2}{n}*R_f + \frac{i-1}{n}*R_a + \frac{j-1}{n}*R_{o1}$ $g_{\triangle \overline{FAO_1}i,j} = \frac{n-i-j+2}{n}*G_f + \frac{i-1}{n}*G_a + \frac{j-1}{n}*G_{o1}$ $b_{\triangle \overline{FAO_1}i,j} = \frac{n-i-j+2}{n}*B_f + \frac{i-1}{n}*B_a + \frac{j-1}{n}*B_{o1}$ |
| 7 | $\triangle \overline{ABO_2}$ | $A(R_a, G_a, B_a)$ $B(R_b, G_b, B_b)$ $O2(R_{o2}, G_{o1}, B_{o2})$ | $r_{\triangle \overline{ABO_2}i,j} = \frac{n-i-j+2}{n}*R_a + \frac{i-1}{n}*R_b + \frac{j-1}{n}*R_{o2}$ $g_{\triangle \overline{ABO_2}i,j} = \frac{n-i-j+2}{n}*G_a + \frac{i-1}{n}*G_b + \frac{j-1}{n}*G_{o2}$ $b_{\triangle \overline{ABO_2}i,j} = \frac{n-i-j+2}{n}*B_a + \frac{i-1}{n}*B_b + \frac{j-1}{n}*B_{o2}$ |
| 8 | $\triangle \overline{BCO_2}$ | $B(R_b, G_b, B_b)$ $C(R_c, G_c, B_c)$ $O2(R_{o2}, G_{o2}, B_{o2})$ | $r_{\triangle \overline{BCO_2}i,j} = \frac{n-i-j+2}{n}*R_b + \frac{i-1}{n}*R_c + \frac{j-1}{n}*R_{o2}$ $g_{\triangle \overline{BCO_2}i,j} = \frac{n-i-j+2}{n}*G_b + \frac{i-1}{n}*G_c + \frac{j-1}{n}*G_{o2}$ $b_{\triangle \overline{BCO_2}i,j} = \frac{n-i-j+2}{n}*B_b + \frac{i-1}{n}*B_c + \frac{j-1}{n}*B_{o2}$ |

TABLE 3-continued

| No. | triangle | triangle endpoint RGB value | triangle mesh point RGB value |
|---|---|---|---|
| 9 | $\triangle\overline{CDO_2}$ | $C(R_c, G_c, B_c)$ $D(R_d, G_d, B_d)$ $O2(R_{o2}, G_{o2}, B_{o2})$ | $r_{\triangle\overline{CDO2}i,j} = \frac{n-i-j+2}{n}*R_c + \frac{i-1}{n}*R_d + \frac{j-1}{n}*R_{o2}$ $g_{\triangle\overline{CDO2}i,j} = \frac{n-i-j+2}{n}*G_c + \frac{i-1}{n}*G_d + \frac{j-1}{n}*G_{o2}$ $b_{\triangle\overline{CDO2}i,j} = \frac{n-i-j+2}{n}*B_c + \frac{i-1}{n}*B_d + \frac{j-1}{n}*B_{o2}$ |
| 10 | $\triangle\overline{DEO_2}$ | $D(R_d, G_d, B_d)$ $E(R_e, G_e, B_e)$ $O2(R_{o2}, G_{o2}, B_{o2})$ | $r_{\triangle\overline{DEO2}i,j} = \frac{n-i-j+2}{n}*R_d + \frac{i-1}{n}*R_e + \frac{j-1}{n}*R_{o2}$ $g_{\triangle\overline{DEO2}i,j} = \frac{n-i-j+2}{n}*G_d + \frac{i-1}{n}*G_e + \frac{j-1}{n}*G_{o2}$ $b_{\triangle\overline{DEO2}i,j} = \frac{n-i-j+2}{n}*B_d + \frac{i-1}{n}*B_e + \frac{j-1}{n}*B_{o2}$ |
| 11 | $\triangle\overline{EFO_2}$ | $E(R_e, G_e, B_e)$ $F(R_f, G_f, B_f)$ $O2(R_{o2}, G_{o2}, B_{o2})$ | $r_{\triangle\overline{EFO2}i,j} = \frac{n-i-j+2}{n}*R_e + \frac{i-1}{n}*R_f + \frac{j-1}{n}*R_{o2}$ $g_{\triangle\overline{EFO2}i,j} = \frac{n-i-j+2}{n}*G_e + \frac{i-1}{n}*G_f + \frac{j-1}{n}*G_{o2}$ $b_{\triangle\overline{EFO2}i,j} = \frac{n-i-j+2}{n}*B_e + \frac{i-1}{n}*B_f + \frac{j-1}{n}*B_{o2}$ |
| 12 | $\triangle\overline{FAO_2}$ | $F(R_f, G_f, B_f)$ $A(R_a, G_a, B_a)$ $O2(R_{o2}, G_{o1}, B_{o2})$ | $r_{\triangle\overline{FAO2}i,j} = \frac{n-i-j+2}{n}*R_f + \frac{i-1}{n}*R_a + \frac{j-1}{n}*R_{o2}$ $g_{\triangle\overline{FAO2}i,j} = \frac{n-i-j+2}{n}*G_f + \frac{i-1}{n}*G_a + \frac{j-1}{n}*G_{o2}$ $b_{\triangle\overline{FAO2}i,j} = \frac{n-i-j+2}{n}*B_f + \frac{i-1}{n}*B_a + \frac{j-1}{n}*B_{o2}$ |
| 13 | $\triangle\overline{AO_1O_2}$ | $A(R_a, G_a, B_a)$ $O1(R_{o1}, G_{o1}, B_{o1})$ $O2(R_{o2}, G_{o2}, B_{o2})$ | $r_{\triangle\overline{AO1O2}i,j} = \frac{n-i-j+2}{n}*R_a + \frac{i-1}{n}*R_{o1} + \frac{j-1}{n}*R_{o2}$ $g_{\triangle\overline{AO1O2}i,j} = \frac{n-i-j+2}{n}*G_a + \frac{i-1}{n}*G_{o1} + \frac{j-1}{n}*G_{o2}$ $b_{\triangle\overline{AO1O2}i,j} = \frac{n-i-j+2}{n}*B_a + \frac{i-1}{n}*B_{o1} + \frac{j-1}{n}*B_{o2}$ |
| 14 | $\triangle\overline{BO_1O_2}$ | $B(R_b, G_b, B_b)$ $O1(R_{o1}, G_{o1}, B_{o1})$ $O2(R_{o2}, G_{o2}, B_{o2})$ | $r_{\triangle\overline{BO1O2}i,j} = \frac{n-i-j+2}{n}*R_b + \frac{i-1}{n}*R_{o1} + \frac{j-1}{n}*R_{o2}$ $g_{\triangle\overline{BO1O2}i,j} = \frac{n-i-j+2}{n}*G_b + \frac{i-1}{n}*G_{o1} + \frac{j-1}{n}*G_{o2}$ $b_{\triangle\overline{BO1O2}i,j} = \frac{n-i-j+2}{n}*B_b + \frac{i-1}{n}*B_{o1} + \frac{j-1}{n}*B_{o2}$ |
| 15 | $\triangle\overline{CO_1O_2}$ | $C(R_c, G_c, B_c)$ $O1(R_{o1}, G_{o1}, B_{o1})$ $O2(R_{o2}, G_{o2}, B_{o2})$ | $r_{\triangle\overline{CO1O2}i,j} = \frac{n-i-j+2}{n}*R_c + \frac{i-1}{n}*R_{o1} + \frac{j-1}{n}*R_{o2}$ $g_{\triangle\overline{CO1O2}i,j} = \frac{n-i-j+2}{n}*G_c + \frac{i-1}{n}*G_{o1} + \frac{j-1}{n}*G_{o2}$ $b_{\triangle\overline{CO1O2}i,j} = \frac{n-i-j+2}{n}*B_c + \frac{i-1}{n}*B_{o1} + \frac{j-1}{n}*B_{o2}$ |
| 16 | $\triangle\overline{DO_1O_2}$ | $D(R_d, G_d, B_d)$ $O1(R_{o1}, G_{o1}, B_{o1})$ $O2(R_{o2}, G_{o2}, B_{o2})$ | $r_{\triangle\overline{DO1O2}i,j} = \frac{n-i-j+2}{n}*R_d + \frac{i-1}{n}*R_{o1} + \frac{j-1}{n}*R_{o2}$ $g_{\triangle\overline{DO1O2}i,j} = \frac{n-i-j+2}{n}*G_d + \frac{i-1}{n}*G_{o1} + \frac{j-1}{n}*G_{o2}$ $b_{\triangle\overline{DO1O2}i,j} = \frac{n-i-j+2}{n}*B_d + \frac{i-1}{n}*B_{o1} + \frac{j-1}{n}*B_{o2}$ |

TABLE 3-continued

| No. | triangle | triangle endpoint RGB value | triangle mesh point RGB value |
|---|---|---|---|
| 17 | $\triangle \overline{EO_1O_2}$ | $E(R_e, G_e, B_e)$ $O1(R_{o1}, G_{o1}, B_{o1})$ $O2(R_{o2}, G_{o2}, B_{o2})$ | $r_{\triangle \overline{EO1O2}i,j} = \frac{n-i-j+2}{n} * R_e + \frac{i-1}{n} * R_{o1} + \frac{j-1}{n} * R_{o2}$ $g_{\triangle \overline{EO1O2}i,j} = \frac{n-i-j+2}{n} * G_e + \frac{i-1}{n} * G_{o1} + \frac{j-1}{n} * G_{o2}$ $b_{\triangle \overline{EO1O2}i,j} = \frac{n-i-j+2}{n} * B_e + \frac{i-1}{n} * B_{o1} + \frac{j-1}{n} * B_{o2}$ |
| 18 | $\triangle \overline{FO_1O_2}$ | $F(R_f, G_f, B_f)$ $O1(R_{o1}, G_{o1}, B_{o1})$ $O2(R_{o2}, G_{o2}, B_{o2})$ | $r_{\triangle \overline{FO1O2}i,j} = \frac{n-i-j+2}{n} * R_f + \frac{i-1}{n} * R_{o1} + \frac{j-1}{n} * R_{o2}$ $g_{\triangle \overline{FO1O2}i,j} = \frac{n-i-j+2}{n} * G_f + \frac{i-1}{n} * G_{o1} + \frac{j-1}{n} * G_{o2}$ $b_{\triangle \overline{FO1O2}i,j} = \frac{n-i-j+2}{n} * B_f + \frac{i-1}{n} * B_{o1} + \frac{j-1}{n} * B_{o2}$ |

For each tetrahedron respectively, mesh digital equal-part division is performed in the tetrahedron to obtain $\sum_{i=1}^{n+1}[i*(i+1)/2]$ mesh points and coordinate values thereof. An interpolation function with mesh point coordinate values as independent variables is obtained in combination with tristimulus values of primary color respectively corresponding to four vertices on the tetrahedron, and tristimulus values of color corresponding to each mesh point are obtained based on mesh point coordinate values as follows:

$$r_{\#i,j,k} = \frac{n-i-j+2}{n} * R_\alpha + \frac{j-1}{n} * R_\beta + \frac{i-k}{n} * R_\gamma + \frac{k-1}{n} * R_\delta$$

$$g_{\#i,j,k} = \frac{n-i-j+2}{n} * G_\alpha + \frac{j-1}{n} * G_\beta + \frac{i-k}{n} * G_\gamma + \frac{k-1}{n} * G_\delta$$

$$b_{\#i,j,k} = \frac{n-i-j+2}{n} * B_\alpha + \frac{j-1}{n} * B_\beta + \frac{i-k}{n} * B_\gamma + \frac{k-1}{n} * B_\delta$$

wherein, $$\sum_{i=1}^{n+1}[i*(i+1)/2]$$

is a preset number of divisions, $i \in \{1, 2, \ldots, n, n+1\}$, $j \in \{1, 2, \ldots, n, n+1\}$, $k \in \{1, 2, \ldots, n, n+1\}$, $i+j \leq (n+2)$, $i+k \leq (n+2)$, $k+j \leq (n+2)$, $r_{\#i,j,k}$, $g_{\#i,j,k}$, $b_{\#i,j,k}$ denote tristimulus values of color corresponding to each mesh point in a tetrahedron, $R_\alpha$, $G_\alpha$, $B_\alpha$ denote tristimulus values of primary color $\alpha$ corresponding to a first vertex on the tetrahedron, $R_\beta$, $G_\beta$, $B_\beta$ denote tristimulus values of primary color $\beta$ corresponding to a second vertex on the tetrahedron, $R_\gamma$, $G_\gamma$, $B_\gamma$ denote tristimulus values of primary color $\gamma$ corresponding to a third vertex on the tetrahedron, and $R_\delta$, $G_\delta$, $B_\delta$ denote tristimulus values of primary color $\delta$ corresponding to a fourth vertex on the tetrahedron.

The tristimulus values of color of each mesh point on each tetrahedron in eight primary color HSB color space are shown in Table 4.

TABLE 4

| No. | tetrahedron | tetrahedron endpoint RGB value | tetrahedron mesh point RGB value |
|---|---|---|---|
| 1 | $\#\overline{O_1O_2AB}$ | $O1(R_{o1}, G_{o1}, B_{o1})$ $O2(R_{o2}, G_{o2}, B_{o2})$ $A(R_a, G_a, B_a)$ $B(R_b, G_b, B_b)$ | $r_{\#\overline{O_1O_2AB}i,j,k} = \frac{n-i-j+2}{n} * R_{o1} + \frac{j-1}{n} * R_{o2} + \frac{i-k}{n} * R_a + \frac{k-1}{n} * R_b$ $g_{\#\overline{O_1O_2AB}i,j,k} = \frac{n-i-j+2}{n} * G_{o1} + \frac{j-1}{n} * G_{o2} + \frac{i-k}{n} * G_a + \frac{k-1}{n} * G_b$ $b_{\#\overline{O_1O_2AB}i,j,k} = \frac{n-i-j+2}{n} * B_{o1} + \frac{j-1}{n} * B_{o2} + \frac{i-k}{n} * B_a + \frac{k-1}{n} * B_b$ |
| 2 | $\#\overline{O_1O_2BC}$ | $O1(R_{o1}, G_{o1}, B_{o1})$ $O2(R_{o2}, G_{o2}, B_{o2})$ $B(R_b, G_b, B_b)$ $C(R_c, G_c, B_c)$ | $r_{\#\overline{O_1O_2BC}i,j,k} = \frac{n-i-j+2}{n} * R_{o1} + \frac{j-1}{n} * R_{o2} + \frac{i-k}{n} * R_b + \frac{k-1}{n} * R_c$ $g_{\#\overline{O_1O_2BC}i,j,k} = \frac{n-i-j+2}{n} * G_{o1} + \frac{j-1}{n} * G_{o2} + \frac{i-k}{n} * G_b + \frac{k-1}{n} * G_c$ $b_{\#\overline{O_1O_2BC}i,j,k} = \frac{n-i-j+2}{n} * B_{o1} + \frac{j-1}{n} * B_{o2} + \frac{i-k}{n} * B_b + \frac{k-1}{n} * B_d$ |
| 3 | $\#\overline{O_1O_2CD}$ | $O1(R_{o1}, G_{o1}, B_{o1})$ $O2(R_{o2}, G_{o2}, B_{o2})$ $C(R_c, G_c, B_c)$ $D(R_d, G_d, B_d)$ | $r_{\#\overline{O_1O_2CD}i,j,k} = \frac{n-i-j+2}{n} * R_{o1} + \frac{j-1}{n} * R_{o2} + \frac{i-k}{n} * R_c + \frac{k-1}{n} * R_d$ |

TABLE 4-continued

| No. | tetrahedron | tetrahedron endpoint RGB value | tetrahedron mesh point RGB value |
|---|---|---|---|
| | | | $g_{\#\overline{O_1O_2CD}i,j,k} = \frac{n-i-j+2}{n}*G_{o1} + \frac{j-1}{n}*G_{o2} + \frac{i-k}{n}*G_c + \frac{k-1}{n}*G_d$ |
| | | | $b_{\#\overline{O_1O_2CD}i,j,k} = \frac{n-i-j+2}{n}*B_{o1} + \frac{j-1}{n}*B_{o2} + \frac{i-k}{n}*B_c + \frac{k-1}{n}*B_d$ |
| 4 | $\#\overline{O_1O_2DE}$ | O1($R_{o1}$, $G_{o1}$, $B_{o1}$) O2($R_{o2}$, $G_{o2}$, $B_{o2}$) D($R_d$, $G_d$, $B_d$) E($R_e$, $G_e$, $B_e$) | $r_{\#\overline{O_1O_2DE}i,j,k} = \frac{n-i-j+2}{n}*R_{o1} + \frac{j-1}{n}*R_{o2} + \frac{i-k}{n}*R_d + \frac{k-1}{n}*R_e$ |
| | | | $g_{\#\overline{O_1O_2DE}i,j,k} = \frac{n-i-j+2}{n}*G_{o1} + \frac{j-1}{n}*G_{o2} + \frac{i-k}{n}*G_d + \frac{k-1}{n}*G_e$ |
| | | | $b_{\#\overline{O_1O_2DE}i,j,k} = \frac{n-i-j+2}{n}*B_{o1} + \frac{j-1}{n}*B_{o2} + \frac{i-k}{n}*B_d + \frac{k-1}{n}*B_e$ |
| 5 | $\#\overline{O_1O_2EF}$ | O1($R_{o1}$, $G_{o1}$, $B_{o1}$) O2($R_{o2}$, $G_{o2}$, $B_{o2}$) E($R_e$, $G_e$, $B_e$) F($R_f$, $G_f$, $B_f$) | $r_{\#\overline{O_1O_2EF}i,j,k} = \frac{n-i-j+2}{n}*R_{o1} + \frac{j-1}{n}*R_{o2} + \frac{i-k}{n}*R_e + \frac{k-1}{n}*R_f$ |
| | | | $g_{\#\overline{O_1O_2EF}i,j,k} = \frac{n-i-j+2}{n}*G_{o1} + \frac{j-1}{n}*G_{o2} + \frac{i-k}{n}*G_e + \frac{k-1}{n}*G_f$ |
| | | | $b_{\#\overline{O_1O_2EF}i,j,k} = \frac{n-i-j+2}{n}*B_{o1} + \frac{j-1}{n}*B_{o2} + \frac{i-k}{n}*B_e + \frac{k-1}{n}*B_f$ |
| 6 | $\#\overline{O_1O_2FA}$ | O1($R_{o1}$, $G_{o1}$, $B_{o1}$) O2($R_{o2}$, $G_{o2}$, $B_{o2}$) F($R_f$, $G_f$, $B_f$) A($R_a$, $G_a$, $B_a$) | $r_{\#\overline{O_1O_2FA}i,j,k} = \frac{n-i-j+2}{n}*R_{o1} + \frac{j-1}{n}*R_{o2} + \frac{i-k}{n}*R_f + \frac{k-1}{n}*R_a$ |
| | | | $g_{\#\overline{O_1O_2FA}i,j,k} = \frac{n-i-j+2}{n}*G_{o1} + \frac{j-1}{n}*G_{o2} + \frac{i-k}{n}*G_f + \frac{k-1}{n}*G_a$ |
| | | | $b_{\#\overline{O_1O_2FA}i,j,k} = \frac{n-i-j+2}{n}*B_{o1} + \frac{j-1}{n}*B_{o2} + \frac{i-k}{n}*B_f + \frac{k-1}{n}*B_a$ |

For each hexahedron respectively, mesh digital equal-part division is performed in the hexahedron to obtain $$\sum_{i=1}^{n+1}[i*(i+1)]$$

mesh points and coordinate values thereof. An interpolation function with mesh point coordinate values as independent variables is obtained in combination with tristimulus values of primary color respectively corresponding to five vertices on the hexahedron, and tristimulus values of color corresponding to each mesh point are obtained based on mesh point coordinate values as follows:

$$r_{i,j,k,l} = \frac{n-i-j+2}{n}*R_\alpha + \frac{j-1}{n}*R_\beta + \frac{i-k}{n}*R_\gamma + \frac{k-1}{n}*R_\delta + \frac{l-1}{n}*R_\varepsilon$$

$$g_{i,j,k,l} = \frac{n-i-j+2}{n}*G_\alpha + \frac{j-1}{n}*G_\beta + \frac{i-k}{n}*G_\gamma + \frac{k-1}{n}*G_\delta + \frac{l-1}{n}*G_\varepsilon$$

$$b_{i,j,k,l} = \frac{n-i-j+2}{n}*B_\alpha + \frac{j-1}{n}*B_\beta + \frac{i-k}{n}*B_\gamma + \frac{k-1}{n}*B_\delta + \frac{l-1}{n}*B_\varepsilon$$

wherein, $$\sum_{i=1}^{n+1}[i*(i+1)]$$

is a preset number of divisions, i∈{1, 2, . . . , n, n+1}, j∈{1, 2, . . . , n, n+1}, k∈{1, 2, . . . , n, n+1}, l∈{1, 2, . . . , n, n+1}, i+j≤(n+2), i+k≤(n+2), i+l≤(n+2), j+k≤(n+2), j+l≤(n+2), k+l≤(n+2), i, j, k, l denote coordinates of hexahedron division mesh points, $r_{i,j,k,l}$, $g_{i,j,k,l}$, $b_{i,j,k,l}$ denote tristimulus values of color corresponding to each mesh point in a hexahedron, $R_\alpha$, $G_\alpha$, $B_\alpha$ denote tristimulus values of primary color α corresponding to a first endpoint on the hexahedron, $R_\beta$, $G_\beta$, $B_\beta$ denote tristimulus values of primary color β corresponding to a second endpoint on the hexahedron, $R_\gamma$, $G_\gamma$, $B_\gamma$ denote tristimulus values of primary color γ corresponding to a third endpoint on the hexahedron, $R_\delta$, $G_\delta$, $B_\delta$ denote tristimulus values of primary color δ corresponding to a fourth endpoint on the hexahedron, and $R_\varepsilon$, $G_\varepsilon$, $B_\varepsilon$ denote tristimulus values of primary color ε corresponding to a fifth endpoint on the hexahedron.

The tristimulus values of color of each mesh point on each hexahedron in eight primary color HSB color space are shown in Table 5.

TABLE 5

| No. | hexahedron | hexahedron endpoint RGB value | hexahedron mesh point RGB value |
|---|---|---|---|
| 1 | $\omega\overline{O_1O_2ACE}$ | $O1(R_{o1}, G_{o1}, B_{o1})$<br>$O2(R_{o2}, G_{o2}, B_{o2})$<br>$A(R_a, G_a, B_a)$<br>$C(R_c, G_c, B_c)$<br>$E(R_e, G_e, B_e)$ | $r_{\omega\overline{O_1O_2ACE}i,j,k,l} = \frac{n-i-j+2}{n}*R_{o1} + \frac{j-1}{n}*R_{o2} + \frac{i-k}{n}*R_a + \frac{k-l}{n}*R_c + \frac{l-1}{n}*R_e$<br>$g_{\omega\overline{O_1O_2ACE}i,j,k,l} = \frac{n-i-j+2}{n}*G_{o1} + \frac{j-1}{n}*G_{o2} + \frac{i-k}{n}*G_a + \frac{k-l}{n}*G_c + \frac{l-1}{n}*G_e$<br>$b_{\omega\overline{O_1O_2ACE}i,j,k,l} = \frac{n-i-j+2}{n}*B_{o1} + \frac{j-1}{n}*B_{o2} + \frac{i-k}{n}*B_a + \frac{k-l}{n}*B_c + \frac{l-1}{n}*B_e$ |
| 2 | $\omega\overline{O_1O_2BDF}$ | $O1(R_{o1}, G_{o1}, B_{o1})$<br>$O2(R_{o2}, G_{o2}, B_{o2})$<br>$B(R_b, G_b, B_b)$<br>$D(R_d, G_d, B_d)$<br>$F(R_f, G_f, B_f)$ | $r_{\omega\overline{O_1O_2BDF}i,j,k,l} = \frac{n-i-j+2}{n}*R_{o1} + \frac{j-1}{n}*R_{o2} + \frac{i-k}{n}*R_b + \frac{k-l}{n}*R_d + \frac{l-1}{n}*R_f$<br>$g_{\omega\overline{O_1O_2BDF}i,j,k,l} = \frac{n-i-j+2}{n}*G_{o1} + \frac{j-1}{n}*G_{o2} + \frac{i-k}{n}*G_b + \frac{k-l}{n}*G_d + \frac{l-1}{n}*G_f$<br>$b_{\omega\overline{O_1O_2BDF}i,j,k,l} = \frac{n-i-j+2}{n}*B_{o1} + \frac{j-1}{n}*B_{o2} + \frac{i-k}{n}*B_b + \frac{k-l}{n}*B_d + \frac{l-1}{n}*B_f$ |

Then proceeding to Step C.

Step C: according to tristimulus values and mesh point coordinate values of eight-element primary color corresponding to each vertex on the 12-surface cone, in each ridgeline, each triangle, each tetrahedron and each hexahedron on the 12-surface cone, a discrete distribution function of tristimulus values of color with mesh point coordinates as independent variables is obtained, so as to realize the construction of a meshed model and a discrete chromatography of eight primary color HSB color space.

In actual application, i.e., based on n=10, binary color mixed color chromatography of eight-element primary color is shown in Table 6.

TABLE 6

| No. | ridgeline | $r_{\xi1}, g_{\xi1}, b_{\xi1}$ | $r_{\xi2}, g_{\xi2}, b_{\xi2}$ | $r_{\xi3}, g_{\xi3}, b_{\xi3}$ | $r_{\xi4}, g_{\xi4}, b_{\xi4}$ | $r_{\xi5}, g_{\xi5}, b_{\xi5}$ | $r_{\xi6}, g_{\xi6}, b_{\xi6}$ | $r_{\xi7}, g_{\xi7}, b_{\xi7}$ | $r_{\xi8}, g_{\xi8}, b_{\xi8}$ | $r_{\xi9}, g_{\xi9}, b_{\xi9}$ | $r_{\xi10}, g_{\xi10}, b_{\xi10}$ | $r_{\xi11}, g_{\xi11}, b_{\xi11}$ |
|---|---|---|---|---|---|---|---|---|---|---|---|---|
| | | \multicolumn{11}{c|}{color value of corresponding mesh coordinate} | | | | | | | | | | | |
| 1 | $\overline{AB}$ | 255, 0, 0 | 255, 26, 0 | 255, 51, 0 | 255, 77, 0 | 255, 102, 0 | 255, 128, 0 | 255, 153, 0 | 255, 179, 0 | 255, 204, 0 | 255, 230, 0 | 255, 255, 0 |
| 2 | $\overline{BC}$ | 255, 255, 0 | 230, 255, 0 | 204, 255, 0 | 179, 255, 0 | 153, 255, 0 | 128, 255, 0 | 102, 255, 0 | 77, 255, 0 | 51, 255, 0 | 26, 255, 0 | 0, 255, 0 |
| 3 | $\overline{CD}$ | 0, 255, 0 | 0, 255, 26 | 0, 255, 51 | 0, 255, 77 | 0, 255, 102 | 0, 255, 128 | 0, 255, 153 | 0, 255, 179 | 0, 255, 204 | 0, 255, 230 | 0, 255, 255 |
| 4 | $\overline{DE}$ | 0, 255, 255 | 0, 230, 255 | 0, 204, 255 | 0, 179, 255 | 0, 153, 255 | 0, 128, 255 | 0, 102, 255 | 0, 77, 255 | 0, 51, 255 | 0, 26, 255 | 0, 0, 255 |
| 5 | $\overline{EF}$ | 0, 0, 255 | 26, 0, 255 | 51, 0, 255 | 77, 0, 255 | 102, 0, 255 | 128, 0, 255 | 153, 0, 255 | 179, 0, 255 | 204, 0, 255 | 230, 0, 255 | 255, 0, 255 |
| 6 | $\overline{FA}$ | 255, 0, 255 | 255, 0, 230 | 255, 0, 204 | 255, 0, 179 | 255, 0, 153 | 255, 0, 128 | 255, 0, 102 | 255, 0, 77 | 255, 0, 51 | 255, 0, 26 | 255, 0, 0 |
| 7 | $\overline{O_1A}$ | 255, 0, 0 | 230, 0, 0 | 204, 0, 0 | 179, 0, 0 | 153, 0, 0 | 128, 0, 0 | 102, 0, 0 | 77, 0, 0 | 51, 0, 0 | 26, 0, 0 | 0, 0, 0 |
| 8 | $\overline{O_1B}$ | 255, 0, 0 | 255, 26, 26 | 255, 51, 51 | 255, 77, 77 | 255, 102, 102 | 255, 128, 128 | 255, 153, 153 | 255, 179, 179 | 255, 204, 204 | 255, 230, 230 | 255, 255, 255 |
| 9 | $\overline{O_1C}$ | 255, 255, 0 | 230, 230, 0 | 204, 204, 0 | 179, 179, 0 | 153, 153, 0 | 128, 128, 0 | 102, 102, 0 | 77, 77, 0 | 51, 51, 0 | 26, 26, 0 | 0, 0, 0 |
| 10 | $\overline{O_1D}$ | 255, 255, 0 | 255, 255, 26 | 255, 255, 51 | 255, 255, 77 | 255, 255, 102 | 255, 255, 128 | 255, 255, 153 | 255, 255, 179 | 255, 255, 204 | 255, 255, 230 | 255, 255, 255 |
| 11 | $\overline{O_1E}$ | 0, 255, 0 | 0, 230, 0 | 0, 204, 0 | 0, 179, 0 | 0, 153, 0 | 0, 128, 0 | 0, 102, 0 | 0, 77, 0 | 0, 51, 0 | 0, 26, 0 | 0, 0, 0 |
| 12 | $\overline{O_1F}$ | 0, 255, 0 | 26, 255, 26 | 51, 255, 51 | 77, 255, 77 | 102, 255, 102 | 128, 255, 128 | 153, 255, 153 | 179, 255, 179 | 204, 255, 204 | 230, 255, 230 | 255, 255, 255 |
| 13 | $\overline{O_2A}$ | 0, 255, 255 | 0, 230, 230 | 0, 204, 204 | 0, 179, 179 | 0, 153, 153 | 0, 128, 128 | 0, 102, 102 | 0, 77, 77 | 0, 51, 51 | 0, 26, 26 | 0, 0, 0 |

TABLE 6-continued

| | | mesh coordinate | | | | | | | | | | |
|---|---|---|---|---|---|---|---|---|---|---|---|---|
| No. | ridgeline | $r_{g1}, g_{g1}, b_{g1}$ | $r_{g2}, g_{g2}, b_{g2}$ | $r_{g3}, g_{g3}, b_{g3}$ | $r_{g4}, g_{g4}, b_{g4}$ | $r_{g5}, g_{g5}, b_{g5}$ | $r_{g6}, g_{g6}, b_{g6}$ | $r_{g7}, g_{g7}, b_{g7}$ | $r_{g8}, g_{g8}, b_{g8}$ | $r_{g9}, g_{g9}, b_{g9}$ | $r_{g10}, g_{g10}, b_{g10}$ | $r_{g11}, g_{g11}, b_{g11}$ |
| | | color value of corresponding mesh coordinate | | | | | | | | | | |
| 14 | $\overline{O_2B}$ | 0, 255, 255 | 26, 255, 255 | 51, 255, 255 | 77, 255, 255 | 102, 255, 255 | 128, 255, 255 | 153, 255, 255 | 179, 255, 255 | 204, 255, 255 | 230, 255, 255 | 255, 255, 255 |
| 15 | $\overline{O_2C}$ | 0, 0, 255 | 0, 0, 230 | 0, 0, 204 | 0, 0, 179 | 0, 0, 153 | 0, 0, 128 | 0, 0, 102 | 0, 0, 77 | 0, 0, 51 | 0, 0, 26 | 0, 0, 0 |
| 16 | $\overline{O_2D}$ | 0, 0, 255 | 26, 26, 255 | 51, 51, 255 | 77, 77, 255 | 102, 102, 255 | 128, 128, 255 | 153, 153, 255 | 179, 179, 255 | 204, 204, 255 | 230, 230, 255 | 255, 255, 255 |
| 17 | $\overline{O_2E}$ | 255, 0, 255 | 230, 0, 230 | 204, 0, 204 | 179, 0, 179 | 153, 0, 153 | 128, 0, 128 | 102, 0, 102 | 77, 0, 77 | 51, 0, 51 | 26, 0, 26 | 0, 0, 0 |
| 18 | $\overline{O_2F}$ | 255, 0, 255 | 255, 26, 255 | 255, 51, 255 | 255, 77, 255 | 255, 102, 255 | 255, 128, 255 | 255, 153, 255 | 255, 179, 255 | 255, 204, 255 | 255, 230, 255 | 255, 255, 255 |
| 19 | $\overline{O_1O_2}$ | 255, 255, 255 | 230, 230, 230 | 204, 204, 204 | 179, 179, 179 | 153, 153, 153 | 128, 128, 128 | 102, 102, 102 | 77, 77, 77 | 51, 51, 51 | 26, 26, 26 | 0, 0, 0 |

Similarly, based on n=10, RGB values (first group) of colors of mesh points of each triangle in eight-element primary color HSB color space are shown in Table 7-1; RGB values (second group) of colors of mesh points of each triangle in eight-element primary color HSB color space are shown in Table 7-2; RGB values (third group) of colors of mesh points of each triangle in eight-element primary color HSB color space are shown in Table 7-3.

TABLE 7-1

| No. | mesh coordinate | color value of mesh point in triangle | | | | | |
|---|---|---|---|---|---|---|---|
| | | $\triangle\overline{ABO_1}$ | $\triangle\overline{BCO_1}$ | $\triangle\overline{CDO_1}$ | $\triangle\overline{DEO_1}$ | $\triangle\overline{EFO_1}$ | $\triangle\overline{FAO_1}$ |
| 1 | $T_{1,1}$ | 255,0,0 | 255,255,0 | 0,255,0 | 0,255,255 | 0,0,255 | 255,0,255 |
| 2 | $T_{1,2}$ | 255,26,0 | 230,255,0 | 0,255,26 | 0,230,255 | 26,0,255 | 255,0,230 |
| 3 | $T_{1,3}$ | 255,51,0 | 204,255,0 | 0,255,51 | 0,204,255 | 51,0,255 | 255,0,204 |
| 4 | $T_{1,4}$ | 255,77,0 | 179,255,0 | 0,255,77 | 0,179,255 | 77,0,255 | 255,0,178 |
| 5 | $T_{1,5}$ | 255,102,0 | 153,255,0 | 0,255,102 | 0,153,255 | 102,0,255 | 255,0,153 |
| 6 | $T_{1,6}$ | 255,128,0 | 128,255,0 | 0,255,128 | 0,128,255 | 128,0,255 | 255,0,128 |
| 7 | $T_{1,7}$ | 255,153,0 | 102,255,0 | 0,255,153 | 0,102,255 | 153,0,255 | 255,0,102 |
| 8 | $T_{1,8}$ | 255,179,0 | 77,255,0 | 0,255,179 | 0,77,255 | 179,0,255 | 255,0,77, |
| 9 | $T_{1,9}$ | 255,204,0 | 51,255,0 | 0,255,204 | 0,51,255 | 204,0,255 | 255,0,51 |
| 10 | $T_{1,10}$ | 255,230,0 | 26,255,0 | 0,255,230 | 0,26,255 | 230,0,255 | 255,0,26 |
| 11 | $T_{1,11}$ | 255,255,0 | 0,255,0 | 0,255,255 | 0,0,255 | 255,0,255 | 255,0,0 |
| 12 | $T_{2,1}$ | 255,26,26 | 255,255,26 | 26,255,26 | 26,255,255 | 26,26,255 | 255,26,255 |
| 13 | $T_{2,2}$ | 255,51,26 | 230,255,26 | 26,255,51 | 26,230,255 | 51,26,255 | 255,26,230 |
| 14 | $T_{2,3}$ | 255,77,26 | 204,255,26 | 26,255,77 | 26,204,255 | 77,26,255 | 255,26,204 |
| 15 | $T_{2,4}$ | 255,102,26 | 179,255,26 | 26,255,102 | 26,179,255 | 102,26,255 | 255,26,178 |
| 16 | $T_{2,5}$ | 255,128,26 | 153,255,26 | 26,255,128 | 26,153,255 | 128,26,255 | 255,26,153 |
| 17 | $T_{2,6}$ | 255,153,26 | 128,255,26 | 26,255,153 | 26,128,255 | 153,26,255 | 255,26,128 |
| 18 | $T_{2,7}$ | 255,179,26 | 102,255,26 | 26,255,179 | 26,102,255 | 179,26,255 | 255,26,102 |
| 19 | $T_{2,8}$ | 255,204,26 | 77,255,26 | 26,255,204 | 26,77,255 | 204,26,255 | 255,26,77 |
| 20 | $T_{2,9}$ | 255,230,26 | 51,255,26 | 26,255,230 | 26,51,255 | 230,26,255 | 255,26,51 |
| 21 | $T_{2,10}$ | 255,255,26 | 26,255,26 | 26,255,255 | 26,26,255 | 255,26,255 | 255,26,26 |
| 22 | $T_{3,1}$ | 255,51,51 | 255,255,51 | 51,255,51 | 51,255,255 | 51,51,255 | 255,51,255 |
| 23 | $T_{3,2}$ | 255,77,51 | 230,255,51 | 51,255,77 | 51,230,255 | 77,51,255 | 255,51,230 |
| 24 | $T_{3,3}$ | 255,102,51 | 204,255,51 | 51,255,102 | 51,204,255 | 102,51,255 | 255,51,204 |
| 25 | $T_{3,4}$ | 255,128,51 | 179,255,51 | 51,255,128 | 51,179,255 | 128,51,255 | 255,51,178 |
| 26 | $T_{3,5}$ | 255,153,51 | 153,255,51 | 51,255,153 | 51,153,255 | 153,51,255 | 255,51,153 |
| 27 | $T_{3,6}$ | 255,179,51 | 128,255,51 | 51,255,179 | 51,128,255 | 179,51,255 | 255,51,128 |
| 28 | $T_{3,7}$ | 255,204,51 | 102,255,51 | 51,255,204 | 51,102,255 | 204,51,255 | 255,51,102 |
| 29 | $T_{3,8}$ | 255,230,51 | 77,255,51 | 51,255,230 | 51,77,255 | 230,51,255 | 255,51,77, |
| 30 | $T_{3,9}$ | 255,255,51 | 51,255,51 | 51,255,255 | 51,51,255 | 255,51,255 | 255,51,51 |
| 31 | $T_{4,1}$ | 255,77,77 | 255,255,77 | 77,255,77 | 77,255,255 | 77,77,255 | 255,77,255 |
| 32 | $T_{4,2}$ | 255,102,77 | 230,255,77 | 77,255,102 | 77,230,255 | 102,77,255 | 255,77,230 |
| 33 | $T_{4,3}$ | 255,128,77 | 204,255,77 | 77,255,128 | 77,204,255 | 128,77,255 | 255,77,204 |
| 34 | $T_{4,4}$ | 255,153,77 | 179,255,77 | 77,255,153 | 77,179,255 | 153,77,255 | 255,77,178 |
| 35 | $T_{4,5}$ | 255,179,77 | 153,255,77 | 77,255,179 | 77,153,255 | 179,77,255 | 255,77,153 |
| 36 | $T_{4,6}$ | 255,204,77 | 128,255,77 | 77,255,204 | 77,128,255 | 204,77,255 | 255,77,128 |
| 37 | $T_{4,7}$ | 255,230,77 | 102,255,77 | 77,255,230 | 77,102,255 | 230,77,255 | 255,77,102 |
| 38 | $T_{4,8}$ | 255,255,77 | 77,255,77 | 77,255,255 | 77,77,255 | 255,77,255 | 255,77,77, |
| 39 | $T_{5,1}$ | 255,102,102 | 255,255,102 | 102,255,102 | 102,255,255 | 102,102,255 | 255,102,255 |
| 40 | $T_{5,2}$ | 255,128,102 | 230,255,102 | 102,255,128 | 102,230,255 | 128,102,255 | 255,102,230 |

TABLE 7-1-continued

| No. | mesh coordinate | color value of mesh point in triangle $\Delta\overline{ABO_1}$ | $\Delta\overline{BCO_1}$ | $\Delta\overline{CDO_1}$ | $\Delta\overline{DEO_1}$ | $\Delta\overline{EFO_1}$ | $\Delta\overline{FAO_1}$ |
|---|---|---|---|---|---|---|---|
| 41 | $T_{5,3}$ | 255,153,102 | 204,255,102 | 102,255,153 | 102,204,255 | 153,102,255 | 255,102,204 |
| 42 | $T_{5,4}$ | 255,179,102 | 179,255,102 | 102,255,179 | 102,179,255 | 179,102,255 | 255,102,178 |
| 43 | $T_{5,5}$ | 255,204,102 | 153,255,102 | 102,255,204 | 102,153,255 | 204,102,255 | 255,102,153 |
| 44 | $T_{5,6}$ | 255,230,102 | 128,255,102 | 102,255,230 | 102,128,255 | 230,102,255 | 255,102,128 |
| 45 | $T_{5,7}$ | 255,255,102 | 102,255,102 | 102,255,255 | 102,102,255 | 255,102,255 | 255,102,102 |
| 46 | $T_{6,1}$ | 255,128,128 | 255,255,128 | 128,255,128 | 128,255,255 | 128,128,255 | 255,129,255 |
| 47 | $T_{6,2}$ | 255,153,128 | 230,255,128 | 128,255,153 | 128,230,255 | 153,128,255 | 255,129,230 |
| 48 | $T_{6,3}$ | 255,179,128 | 204,255,128 | 128,255,179 | 128,204,255 | 179,128,255 | 255,129,204 |
| 49 | $T_{6,4}$ | 255,204,128 | 179,255,128 | 128,255,204 | 128,179,255 | 204,128,255 | 255,129,178 |
| 50 | $T_{6,5}$ | 255,230,128 | 153,255,128 | 128,255,230 | 128,153,255 | 230,128,255 | 255,129,153 |
| 51 | $T_{6,6}$ | 255,255,128 | 128,255,128 | 128,255,255 | 128,128,255 | 255,128,255 | 255,129,128 |
| 52 | $T_{7,1}$ | 255,153,153 | 255,255,153 | 153,255,153 | 153,255,255 | 153,153,255 | 255,153,255 |
| 53 | $T_{7,2}$ | 255,179,153 | 230,255,153 | 153,255,179 | 153,230,255 | 179,153,255 | 255,153,230 |
| 54 | $T_{7,3}$ | 255,204,153 | 204,255,153 | 153,255,204 | 153,204,255 | 204,153,255 | 255,153,204 |
| 55 | $T_{7,4}$ | 255,230,153 | 179,255,153 | 153,255,230 | 153,179,255 | 230,153,255 | 255,153,178 |
| 56 | $T_{7,5}$ | 255,255,153 | 153,255,153 | 153,255,255 | 153,153,255 | 255,153,255 | 255,153,153 |
| 57 | $T_{8,1}$ | 255,179,179 | 255,255,179 | 179,255,179 | 179,255,255 | 179,179,255 | 255,179,255 |
| 58 | $T_{8,2}$ | 255,204,179 | 230,255,179 | 179,255,204 | 179,230,255 | 204,179,255 | 255,179,230 |
| 59 | $T_{8,3}$ | 255,230,179 | 204,255,179 | 179,255,230 | 179,204,255 | 230,179,255 | 255,179,204 |
| 60 | $T_{8,4}$ | 255,255,179 | 179,255,179 | 179,255,255 | 179,179,255 | 255,179,255 | 255,179,178 |
| 61 | $T_{9,1}$ | 255,204,204 | 255,255,204 | 204,255,204 | 204,255,255 | 204,204,255 | 255,204,255 |
| 62 | $T_{9,2}$ | 255,230,204 | 230,255,204 | 204,255,230 | 204,230,255 | 230,204,255 | 255,204,230 |
| 63 | $T_{9,3}$ | 255,255,204 | 204,255,204 | 204,255,255 | 204,204,255 | 255,204,255 | 255,204,204 |
| 64 | $T_{10,1}$ | 255,230,230 | 255,255,230 | 230,255,230 | 230,255,255 | 230,230,255 | 255,230,255 |
| 65 | $T_{10,2}$ | 255,255,230 | 230,255,230 | 230,255,255 | 230,230,255 | 255,230,255 | 255,230,230 |
| 66 | $T_{11,1}$ | 255,255,255 | 255,255,255 | 255,255,255 | 255,255,255 | 255,255,255 | 255,255,255 |

Table 7-2

| No. | mesh coordinate | color value of mesh point in triangle $\Delta\overline{ABO_2}$ | $\Delta\overline{BCO_2}$ | $\Delta\overline{CDO_2}$ | $\Delta\overline{DEO_2}$ | $\Delta\overline{EFO_2}$ | $\Delta\overline{FAO_2}$ |
|---|---|---|---|---|---|---|---|
| 1 | $T_{1,1}$ | 255,0,0 | 255,255,0 | 0,255,0 | 0,255,255 | 0,0,255 | 255,0,255 |
| 2 | $T_{1,2}$ | 255,26,0 | 230,255,0 | 0,255,26 | 0,230,255 | 26,0,255 | 255,0,230 |
| 3 | $T_{1,3}$ | 255,51,0 | 204,255,0 | 0,255,51 | 0,204,255 | 51,0,255 | 255,0,204 |
| 4 | $T_{1,4}$ | 255,77,0 | 179,255,0 | 0,255,77 | 0,179,255 | 77,0,255 | 255,0,179 |
| 5 | $T_{1,5}$ | 255,102,0 | 153,255,0 | 0,255,102 | 0,153,255 | 102,0,255 | 255,0,153 |
| 6 | $T_{1,6}$ | 255,128,0 | 128,255,0 | 0,255,128 | 0,128,255 | 128,0,255 | 255,0,128 |
| 7 | $T_{1,7}$ | 255,153,0 | 102,255,0 | 0,255,153 | 0,102,255 | 153,0,255 | 255,0,102 |
| 8 | $T_{1,8}$ | 255,179,0 | 77,255,0 | 0,255,179 | 0,77,255 | 179,0,255 | 255,0,77 |
| 9 | $T_{1,9}$ | 255,204,0 | 51,255,0 | 0,255,204 | 0,51,255 | 204,0,255 | 255,0,51 |
| 10 | $T_{1,10}$ | 255,230,0 | 26,255,0 | 0,255,230 | 0,26,255 | 230,0,255 | 255,0,26 |
| 11 | $T_{1,11}$ | 255,255,0 | 0,255,0 | 0,255,255 | 0,0,255 | 255,0,255 | 255,0,0 |
| 12 | $T_{2,1}$ | 230,0,0 | 230,230,0 | 0,230,0 | 0,230,230 | 0,0,230 | 230,0,230 |
| 13 | $T_{2,2}$ | 230,26,0 | 204,230,0 | 0,230,26 | 0,204,230 | 26,0,230 | 230,0,204 |
| 14 | $T_{2,3}$ | 230,51,0 | 179,230,0 | 0,230,51 | 0,179,230 | 51,0,230 | 230,0,179 |
| 15 | $T_{2,4}$ | 230,77,0 | 153,230,0 | 0,230,77 | 0,153,230 | 77,0,230 | 230,0,153 |
| 16 | $T_{2,5}$ | 230,102,0 | 128,230,0 | 0,230,102 | 0,128,230 | 102,0,230 | 230,0,128 |
| 17 | $T_{2,6}$ | 230,128,0 | 102,230,0 | 0,230,128 | 0,102,230 | 128,0,230 | 230,0,102 |
| 18 | $T_{2,7}$ | 230,153,0 | 77,230,0 | 0,230,153 | 0,77,230 | 153,0,230 | 230,0,77 |
| 19 | $T_{2,8}$ | 230,179,0 | 51,230,0 | 0,230,179 | 0,51,230 | 179,0,230 | 230,0,51 |
| 20 | $T_{2,9}$ | 230,204,0 | 26,230,0 | 0,230,204 | 0,26,230 | 204,0,230 | 230,0,26 |
| 21 | $T_{2,10}$ | 230,230,0 | 0,230,0 | 0,230,230 | 0,0,230 | 230,0,230 | 230,0,0 |
| 22 | $T_{3,1}$ | 204,0,0 | 204,204,0 | 0,204,0 | 0,204,204 | 0,0,204 | 204,0,204 |
| 23 | $T_{3,2}$ | 204,26,0 | 179,204,0 | 0,204,26 | 0,179,204 | 26,0,204 | 204,0,179 |
| 24 | $T_{3,3}$ | 204,51,0 | 153,204,0 | 0,204,51 | 0,153,204 | 51,0,204 | 204,0,153 |
| 25 | $T_{3,4}$ | 204,77,0 | 128,204,0 | 0,204,77 | 0,128,204 | 77,0,204 | 204,0,128 |
| 26 | $T_{3,5}$ | 204,102,0 | 102,204,0 | 0,204,102 | 0,102,204 | 102,0,204 | 204,0,102 |
| 27 | $T_{3,6}$ | 204,128,0 | 77,204,0 | 0,204,128 | 0,77,204 | 128,0,204 | 204,0,77 |
| 28 | $T_{3,7}$ | 204,153,0 | 51,204,0 | 0,204,153 | 0,51,204 | 153,0,204 | 204,0,51 |
| 29 | $T_{3,8}$ | 204,179,0 | 26,204,0 | 0,204,179 | 0,26,204 | 179,0,204 | 204,0,26 |
| 30 | $T_{3,9}$ | 204,204,0 | 0,204,0 | 0,204,204 | 0,0,204 | 204,0,204 | 204,0,0 |
| 31 | $T_{4,1}$ | 179,0,0 | 179,179,0 | 0,179,0 | 0,179,179 | 0,0,179 | 179,0,179 |
| 32 | $T_{4,2}$ | 179,26,0 | 153,179,0 | 0,179,26 | 0,153,179 | 26,0,179 | 179,0,153 |
| 33 | $T_{4,3}$ | 179,51,0 | 128,179,0 | 0,179,51 | 0,128,179 | 51,0,179 | 179,0,128 |
| 34 | $T_{4,4}$ | 179,77,0 | 102,179,0 | 0,179,77 | 0,102,179 | 77,0,179 | 179,0,102 |
| 35 | $T_{4,5}$ | 179,102,0 | 77,179,0 | 0,179,102 | 0,77,179 | 102,0,179 | 179,0,77 |
| 36 | $T_{4,6}$ | 179,128,0 | 51,179,0 | 0,179,128 | 0,51,179 | 128,0,179 | 179,0,51 |
| 37 | $T_{4,7}$ | 179,153,0 | 26,179,0 | 0,179,153 | 0,26,179 | 153,0,179 | 179,0,26 |
| 38 | $T_{4,8}$ | 179,179,0 | 0,179,0 | 0,179,179 | 0,0,179 | 179,0,179 | 179,0,0 |
| 39 | $T_{5,1}$ | 153,0,0 | 153,153,0 | 0,153,0 | 0,153,153 | 0,0,153 | 153,0,153 |
| 40 | $T_{5,2}$ | 153,26,0 | 128,153,0 | 0,153,26 | 0,128,153 | 26,0,153 | 153,0,128 |

Table 7-2-continued

| No. | mesh coordinate | color value of mesh point in triangle | | | | | |
|---|---|---|---|---|---|---|---|
| | | $\Delta\overline{ABO_2}$ | $\Delta\overline{BCO_2}$ | $\Delta\overline{CDO_2}$ | $\Delta\overline{DEO_2}$ | $\Delta\overline{EFO_2}$ | $\Delta\overline{FAO_2}$ |
| 41 | $T_{5,3}$ | 153,51,0 | 102,153,0 | 0,153,51 | 0,102,153 | 51,0,153 | 153,0,102 |
| 42 | $T_{5,4}$ | 153,77,0 | 77,153,0 | 0,153,77 | 0,77,153 | 77,0,153 | 153,0,77 |
| 43 | $T_{5,5}$ | 153,102,0 | 51,153,0 | 0,153,102 | 0,51,153 | 102,0,153 | 153,0,51 |
| 44 | $T_{5,6}$ | 153,128,0 | 26,153,0 | 0,153,128 | 0,26,153 | 128,0,153 | 153,0,26 |
| 45 | $T_{5,7}$ | 153,153,0 | 0,153,0 | 0,153,153 | 0,0,153 | 153,0,153 | 153,0,0 |
| 46 | $T_{6,1}$ | 128,0,0 | 128,128,0 | 0,128,0 | 0,128,128 | 0,0,128 | 128,0,128 |
| 47 | $T_{6,2}$ | 128,26,0 | 102,128,0 | 0,128,26 | 0,102,128 | 26,0,128 | 128,0,102 |
| 48 | $T_{6,3}$ | 128,51,0 | 77,128,0 | 0,128,51 | 0,77,128 | 51,0,128 | 128,0,77 |
| 49 | $T_{6,4}$ | 128,77,0 | 51,128,0 | 0,128,77 | 0,51,128 | 77,0,128 | 128,0,51 |
| 50 | $T_{6,5}$ | 128,102,0 | 26,128,0 | 0,128,102 | 0,26,128 | 102,0,128 | 128,0,26 |
| 51 | $T_{6,6}$ | 128,128,0 | 0,128,0 | 0,128,128 | 0,0,128 | 128,0,128 | 128,0,0 |
| 52 | $T_{7,1}$ | 102,0,0 | 102,102,0 | 0,102,0 | 0,102,102 | 0,0,102 | 102,0,102 |
| 53 | $T_{7,2}$ | 102,26,0 | 77,102,0 | 0,102,26 | 0,77,102 | 26,0,102 | 102,0,77 |
| 54 | $T_{7,3}$ | 102,51,0 | 51,102,0 | 0,102,51 | 0,51,102 | 51,0,102 | 102,0,51 |
| 55 | $T_{7,4}$ | 102,77,0 | 26,102,0 | 0,102,77 | 0,26,102 | 77,0,102 | 102,0,26 |
| 56 | $T_{7,5}$ | 102,102,0 | 0,102,0 | 0,102,102 | 0,0,102 | 102,0,102 | 102,0,0 |
| 57 | $T_{8,1}$ | 77,0,0 | 77,77,0 | 0,77,0 | 0,77,77 | 0,0,77 | 77,0,77 |
| 58 | $T_{8,2}$ | 77,26,0 | 51,77,0 | 0,77,26 | 0,51,77 | 26,0,77 | 77,0,51 |
| 59 | $T_{8,3}$ | 77,51,0 | 26,77,0 | 0,77,51 | 0,26,77 | 51,0,77 | 77,0,26 |
| 60 | $T_{8,4}$ | 77,77,0 | 0,77,0 | 0,77,77 | 0,0,77 | 77,0,77 | 77,0,0 |
| 61 | $T_{9,1}$ | 51,0,0 | 51,51,0 | 0,51,0 | 0,51,51 | 0,0,51 | 51,0,51 |
| 62 | $T_{9,2}$ | 51,26,0 | 26,51,0 | 0,51,26 | 0,26,51 | 26,0,51 | 51,0,26 |
| 63 | $T_{9,3}$ | 51,51,0 | 0,51,0 | 0,51,51 | 0,0,51 | 51,0,51 | 51,0,0 |
| 64 | $T_{10,1}$ | 26,0,0 | 26,26,0 | 0,26,0 | 0,26,26 | 0,0,26 | 26,0,26 |
| 65 | $T_{10,2}$ | 26,26,0 | 0,26,0 | 0,26,26 | 0,0,26 | 26,0,26 | 26,0,0 |
| 66 | $T_{11,1}$ | 0,0,0 | 0,0,0 | 0,0,0 | 0,0,0 | 0,0,0 | 0,0,0 |

TABLE 7-3

| No. | mesh coordinate | color value of mesh point in triangle | | | | | |
|---|---|---|---|---|---|---|---|
| | | $\Delta\overline{AO_1O_2}$ | $\Delta\overline{BO_1O_2}$ | $\Delta\overline{CO_1O_2}$ | $\Delta\overline{DO_1O_2}$ | $\Delta\overline{EO_1O_2}$ | $\Delta\overline{FO_1O_2}$ |
| 1 | $T_{1,1}$ | 255,255,255 | 255,255,255 | 255,255,255 | 255,255,255 | 255,255,255 | 255,255,255 |
| 2 | $T_{1,2}$ | 230,230,230 | 230,230,230 | 230,230,230 | 230,230,230 | 230,230,230 | 230,230,230 |
| 3 | $T_{1,3}$ | 204,204,204 | 204,204,204 | 204,204,204 | 204,204,204 | 204,204,204 | 204,204,204 |
| 4 | $T_{1,4}$ | 179,179,179 | 179,179,179 | 179,179,179 | 179,179,179 | 179,179,179 | 179,179,179 |
| 5 | $T_{1,5}$ | 153,153,153 | 153,153,153 | 153,153,153 | 153,153,153 | 153,153,153 | 153,153,153 |
| 6 | $T_{1,6}$ | 128,128,128 | 128,128,128 | 128,128,128 | 128,128,128 | 128,128,128 | 128,128,128 |
| 7 | $T_{1,7}$ | 102,102,102 | 102,102,102 | 102,102,102 | 102,102,102 | 102,102,102 | 102,102,102 |
| 8 | $T_{1,8}$ | 77,77,77 | 77,77,77 | 77,77,77 | 77,77,77 | 77,77,77 | 77,77,77 |
| 9 | $T_{1,9}$ | 51,51,51 | 51,51,51 | 51,51,51 | 51,51,51 | 51,51,51 | 51,51,51 |
| 10 | $T_{1,10}$ | 26,26,26 | 26,26,26 | 26,26,26 | 26,26,26 | 26,26,26 | 26,26,26 |
| 11 | $T_{1,11}$ | 0,0,0 | 0,0,0 | 0,0,0 | 0,0,0 | 0,0,0 | 0,0,0 |
| 12 | $T_{2,1}$ | 255,230,230 | 255,255,230 | 230,255,230 | 230,255,255 | 230,230,255 | 255,230,255 |
| 13 | $T_{2,2}$ | 230,204,204 | 230,230,204 | 204,230,204 | 204,230,230 | 204,204,230 | 230,204,230 |
| 14 | $T_{2,3}$ | 204,179,179 | 204,204,179.00 | 179,204,179 | 179,204,204 | 179,179,204 | 204,179,204 |
| 15 | $T_{2,4}$ | 179,153,153 | 179,179,153 | 153,179,153 | 153,179,179 | 153,153,179 | 179,153,179 |
| 16 | $T_{2,5}$ | 153,128,128 | 153,153,128.00 | 128,153,128 | 128,153,153 | 128,128,153 | 153,128,153 |
| 17 | $T_{2,6}$ | 128,102,102 | 128,128,102 | 102,128,102 | 102,128,128 | 102,102,128 | 128,102,128 |
| 18 | $T_{2,7}$ | 102,77,77 | 102,102,77 | 77,102,77 | 77,102,102 | 77,77,102 | 102,77,102 |
| 19 | $T_{2,8}$ | 77,51,51 | 77,77,51 | 51,77,51 | 51,77,77 | 51,51,77 | 77,51,77 |
| 20 | $T_{2,9}$ | 51,26,26 | 51,51,26 | 26,51,26 | 26,51,51 | 26,26,51 | 51,26,51 |
| 21 | $T_{2,10}$ | 26,0,0 | 26,26,0 | 0,26,0 | 0,26,26 | 0,0,26 | 26,0,26 |
| 22 | $T_{3,1}$ | 255,204,204 | 255,255,204 | 204,255,204 | 204,255,255 | 204,204,255 | 255,204,255 |
| 23 | $T_{3,2}$ | 230,179,179 | 230,230,179 | 179,230,179 | 179,230,230 | 179,179,230 | 230,179,230 |
| 24 | $T_{3,3}$ | 204,153,153 | 204,204,153 | 153,204,153 | 153,204,204 | 153,153,204 | 204,153,204 |
| 25 | $T_{3,4}$ | 179,128,128 | 179,179,128 | 128,179,128 | 128,179,179 | 128,128,179 | 179,128,179 |
| 26 | $T_{3,5}$ | 153,102,102 | 153,153,102 | 102,153,102 | 102,153,153 | 102,102,153 | 153,102,153 |
| 27 | $T_{3,6}$ | 128,77,77 | 128,128,77 | 77,128,77 | 77,128,128 | 77,77,128 | 128,77,128 |
| 28 | $T_{3,7}$ | 102,51,51 | 102,102,51 | 51,102,51 | 51,102,102 | 51,51,102 | 102,51,102 |
| 29 | $T_{3,8}$ | 77,26,26 | 77,77,26 | 26,77,26 | 26,77,77 | 26,26,77 | 77,26,77 |
| 30 | $T_{3,9}$ | 51,0,0 | 51,51,0 | 0,51,0 | 0,51,51 | 0,0,51 | 51,0,51 |
| 31 | $T_{4,1}$ | 255,179,179 | 255,255,179 | 179,255,179 | 179,255,255 | 179,179,255 | 255,179,255 |
| 32 | $T_{4,2}$ | 230,153,153 | 230,230,153 | 153,230,153 | 153,230,230 | 153,153,230 | 230,153,230 |
| 33 | $T_{4,3}$ | 204,128,128 | 204,204,128 | 128,204,128 | 128,204,204 | 128,128,204 | 204,128,204 |
| 34 | $T_{4,4}$ | 179,102,102 | 179,179,102 | 102,179,102 | 102,179,179 | 102,102,179 | 179,102,179 |
| 35 | $T_{4,5}$ | 153,77,77 | 153,153,77 | 77,153,77 | 77,153,153 | 77,77,153 | 153,77,153 |
| 36 | $T_{4,6}$ | 128,51,51 | 128,128,51 | 51,128,51 | 51,128,128 | 51,51,128 | 128,51,128 |
| 37 | $T_{4,7}$ | 102,26,26 | 102,102,26 | 26,102,26 | 26,102,102 | 26,26,102 | 102,26,102 |
| 38 | $T_{4,8}$ | 77,0,0 | 77,77,0 | 0,77,0 | 0,77,77 | 0,0,77 | 77,0,77 |
| 39 | $T_{5,1}$ | 255,153,153 | 255,255,153 | 153,255,153 | 153,255,255 | 153,153,255 | 255,153,255 |
| 40 | $T_{5,2}$ | 230,128,128 | 230,230,128 | 128,230,128 | 128,230,230 | 128,128,230 | 230,128,230 |

TABLE 7-3-continued

| No. | mesh coordinate | color value of mesh point in triangle ||||||
|---|---|---|---|---|---|---|---|
| | | $\Delta\overline{AO_1O_2}$ | $\Delta\overline{BO_1O_2}$ | $\Delta\overline{CO_1O_2}$ | $\Delta\overline{DO_1O_2}$ | $\Delta\overline{EO_1O_2}$ | $\Delta\overline{FO_1O_2}$ |
| 41 | $T_{5,3}$ | 204,102,102 | 204,204,102 | 102,204,102 | 102,204,204 | 102,102,204 | 204,102,204 |
| 42 | $T_{5,4}$ | 179,77,77 | 179,179,77 | 77,179,77 | 77,179,179 | 77,77,179 | 179,77,179 |
| 43 | $T_{5,5}$ | 153,51,51 | 153,153,51 | 51,153,51 | 51,153,153 | 51,51,153 | 153,51,153 |
| 44 | $T_{5,6}$ | 128,26,26 | 128,128,26 | 26,128,26 | 26,128,128 | 26,26,128 | 128,26,128 |
| 45 | $T_{5,7}$ | 102,0,0 | 102,102,0 | 0,102,0 | 0,102,102 | 0,0,102 | 102,0,102 |
| 46 | $T_{6,1}$ | 255,128,128 | 255,255,128.00 | 128,255,128 | 128,255,255 | 128,128,255 | 255,128,255 |
| 47 | $T_{6,2}$ | 230,102,102 | 230,230,102 | 102,230,102 | 102,230,230 | 102,102,230 | 230,102,230 |
| 48 | $T_{6,3}$ | 204,77,77 | 204,204,77 | 77,204,77 | 77,204,204 | 77,77,204 | 204,77,204 |
| 49 | $T_{6,4}$ | 179,51,51 | 179,179,51 | 51,179,51 | 51,179,179 | 51,51,179 | 179,51,179 |
| 50 | $T_{6,5}$ | 153,26,26 | 153,153,26 | 26,153,26 | 26,153,153 | 26,26,153 | 153,26,153 |
| 51 | $T_{6,6}$ | 128,0,0 | 128,128,0 | 0,128,0 | 0,128,128 | 0,0,128 | 128,0,128 |
| 52 | $T_{7,1}$ | 255,102,102 | 255,255,102 | 102,255,102 | 102,255,255 | 102,102,255 | 255,102,255 |
| 53 | $T_{7,2}$ | 230,77,77 | 230,230,77 | 77,230,77 | 77,230,230 | 77,77,230 | 230,77,230 |
| 54 | $T_{7,3}$ | 204,51,51 | 204,204,51 | 51,204,51, | 51,204,204 | 51,51,204 | 204,51,204 |
| 55 | $T_{7,4}$ | 179,26,26 | 179,179,26 | 26,179,26 | 26,179,179 | 26,26,179 | 179,26,179 |
| 56 | $T_{7,5}$ | 153,0,0 | 153,153,0 | 0,153,0 | 0,153,153 | 0,0,153 | 153,0,153 |
| 57 | $T_{8,1}$ | 255,77,77 | 255,255,77 | 77,255,77 | 77,255,255 | 77,77,255 | 255,77,255 |
| 58 | $T_{8,2}$ | 230,51,51 | 230,230,51 | 51,230,51 | 51,230,230 | 51,51,230 | 230,51,230 |
| 59 | $T_{8,3}$ | 204,26,26 | 204,204,26 | 26,204,26 | 26,204,204 | 26,26,204 | 204,26,204 |
| 60 | $T_{8,4}$ | 179,0,0 | 179,179,0 | 0,179,0 | 0,179,179 | 0,0,179 | 179,0,179 |
| 61 | $T_{9,1}$ | 255,51,51 | 255,255,51 | 51,255,51 | 51,255,255 | 51,51,255 | 255,51,255 |
| 62 | $T_{9,2}$ | 230,26,26 | 230,230,26 | 26,230,26 | 26,230,230 | 26,26,230 | 230,26,230 |
| 63 | $T_{9,3}$ | 204,0,0 | 204,204,0 | 0,204,0 | 0,204,204 | 0,0,204 | 204,0,204 |
| 64 | $T_{10,1}$ | 255,26,26 | 255,255,26 | 26,255,26 | 26,255,255 | 26,26,255 | 255,26,255 |
| 65 | $T_{10,2}$ | 230,0,0 | 230,230,0 | 0,230,0 | 0,230,230 | 0,0,230 | 230,0,230 |
| 66 | $T_{11,1}$ | 255,0,0 | 255,255,0 | 0,255,0 | 0,255,255 | 0,0,255 | 255,0,255 |

In addition, based on n=10, RGB values of colors of mesh points on each tetrahedron in eight-element primary color HSB color space are shown in Table 8.

TABLE 8

| No. | mesh coordinates | RGB of color of mesh point on each tetrahedron in color space ||||||
|---|---|---|---|---|---|---|---|
| | | #$\overline{O_1O_2AB}$ | #$\overline{O_1O_2BC}$ | #$\overline{O_1O_2CD}$ | #$\overline{O_1O_2DE}$ | #$\overline{O_1O_2EF}$ | #$\overline{O_1O_2FA}$ |
| 1 | $T_{1,1,1}$ | 255,0,0 | 255,255,0 | 0,255,0 | 0,255,255 | 0,0,255 | 255,0,255 |
| 2 | $T_{1,2,1}$ | 255,26,0 | 230,255,0 | 0,255,26 | 0,230,255 | 26,0,255 | 255,0,230 |
| 3 | $T_{1,3,1}$ | 255,51,0 | 204,255,0 | 0,255,51 | 0,204,255 | 51,0,255 | 255,0,204 |
| 4 | $T_{1,4,1}$ | 255,77,0 | 179,255,0 | 0,255,77 | 0,179,255 | 77,0,255 | 255,0,179 |
| 5 | $T_{1,5,1}$ | 255,102,0 | 153,255,0 | 0,255,102 | 0,153,255 | 102,0,255 | 255,0,153 |
| 6 | $T_{1,6,1}$ | 255,128,0 | 128,255,0 | 0,255,128 | 0,128,255 | 128,0,255 | 255,0,128 |
| 7 | $T_{1,7,1}$ | 255,153,0 | 102,255,0 | 0,255,153 | 0,102,255 | 153,0,255 | 255,0,102 |
| 8 | $T_{1,8,1}$ | 255,179,0 | 77,255,0 | 0,255,179 | 0,77,255 | 179,0,255 | 255,0,77 |
| 9 | $T_{1,9,1}$ | 255,204,0 | 51,255,0 | 0,255,204 | 0,51,255 | 204,0,255 | 255,0,51 |
| 10 | $T_{1,10,1}$ | 255,230,0 | 26,255,0 | 0,255,230 | 0,26,255 | 230,0,255 | 255,0,26 |
| 11 | $T_{1,11,1}$ | 255,255,0 | 0,255,0 | 0,255,255 | 0,0,255 | 255,0,255 | 255,0,0 |
| 12 | $T_{2,1,1}$ | 255,26,26 | 255,255,26 | 26,255,26 | 26,255,255 | 26,26,255 | 255,26,255 |
| 13 | $T_{2,1,2}$ | 230,0,0 | 230,230,0 | 0,230,0 | 0,230,230 | 0,0,230 | 230,0,230 |
| 14 | $T_{2,2,1}$ | 255,51,26 | 230,255,26 | 26,255,51 | 26,230,255 | 51,26,255 | 255,26,230 |
| 15 | $T_{2,2,2}$ | 230,26,0 | 204,230,0 | 0,230,26 | 0,204,230 | 26,0,230 | 230,0,204 |
| 16 | $T_{2,3,1}$ | 255,77,26 | 204,255,26 | 26,255,77 | 26,204,255 | 77,26,255 | 255,26,204 |
| 17 | $T_{2,3,2}$ | 230,51,0 | 179,230,0 | 0,230,51 | 0,179,230 | 51,0,230 | 230,0,179 |
| 18 | $T_{2,4,1}$ | 255,102,26 | 179,255,26 | 26,255,102 | 26,179,255 | 102,26,255 | 255,26,179 |
| 19 | $T_{2,4,2}$ | 230,77,0 | 153,230,0 | 0,230,77 | 0,153,230 | 77,0,230 | 230,0,153 |
| 20 | $T_{2,5,1}$ | 255,128,26 | 153,255,26 | 26,255,128 | 26,153,255 | 128,26,255 | 255,26,153 |
| 21 | $T_{2,5,2}$ | 230,102,0 | 128,230,0 | 0,230,102 | 0,128,230 | 102,0,230 | 230,0,128 |
| 22 | $T_{2,6,1}$ | 255,153,26 | 128,255,26 | 26,255,153 | 26,128,255 | 153,26,255 | 255,26,128 |
| 23 | $T_{2,6,2}$ | 230,128,0 | 102,230,0 | 0,230,128 | 0,102,230 | 128,0,230 | 230,0,102 |
| 24 | $T_{2,7,1}$ | 255,179,26 | 102,255,26 | 26,255,179 | 26,102,255 | 179,26,255 | 255,26,102 |
| 25 | $T_{2,7,2}$ | 230,153,0 | 77,230,0 | 0,230,153 | 0,77,230 | 153,0,230 | 230,0,77 |
| 26 | $T_{2,8,1}$ | 255,204,26 | 77,255,26 | 26,255,204 | 26,77,255 | 204,26,255 | 255,26,77 |
| 27 | $T_{2,8,2}$ | 230,179,0 | 51,230,0 | 0,230,179 | 0,51,230 | 179,0,230 | 230,0,51 |
| 28 | $T_{2,9,1}$ | 255,230,26 | 51,255,26 | 26,255,230 | 26,51,255 | 230,26,255 | 255,26,51 |
| 29 | $T_{2,9,2}$ | 230,204,0 | 26,230,0 | 0,230,204 | 0,26,230 | 204,0,230 | 230,0,26 |
| 30 | $T_{2,10,1}$ | 255,255,26 | 26,255,26 | 26,255,255 | 26,26,255 | 255,26,255 | 255,26,26 |
| 31 | $T_{2,10,2}$ | 230,230,0 | 0,230,0 | 0,230,230 | 0,0,230 | 230,0,230 | 230,0,0 |
| 32 | $T_{3,1,1}$ | 255,51,51 | 255,255,51 | 51,255,51 | 51,255,255 | 51,51,255 | 255,51,255 |
| 33 | $T_{3,4,2}$ | 230,26,26 | 230,230,26 | 26,230,26 | 26,230,230 | 26,26,230 | 230,26,230 |
| 34 | $T_{3,1,3}$ | 204,0,0 | 204,204,0 | 0,204,0 | 0,204,204 | 0,0,204 | 204,0,204 |
| 35 | $T_{3,2,1}$ | 255,77,51 | 230,255,51 | 51,255,77 | 51,230,255 | 77,51,255 | 255,51,230 |
| 36 | $T_{3,2,2}$ | 230,51,26 | 204,230,26 | 26,230,51 | 26,204,230 | 51,26,230 | 230,26,204 |

TABLE 8-continued

| | | RGB of color of mesh point on each tetrahedron in color space | | | | | |
|---|---|---|---|---|---|---|---|
| No. | mesh coordinates | #$\overline{O_1O_2AB}$ | #$\overline{O_1O_2BC}$ | #$\overline{O_1O_2CD}$ | #$\overline{O_1O_2DE}$ | #$\overline{O_1O_2EF}$ | #$\overline{O_1O_2FA}$ |
| 37 | $T_{3,2,3}$ | 204,26,0 | 179,204,0 | 0,204,26 | 0,179,204 | 26,0,204 | 204,0,179 |
| 38 | $T_{3,3,1}$ | 255,102,51 | 204,255,51 | 51,255,102 | 51,204,255 | 102,51,255 | 255,51,204 |
| 39 | $T_{3,3,2}$ | 230,77,26 | 179,230,26 | 26,230,77 | 26,179,230 | 77,26,230 | 230,26,179 |
| 40 | $T_{3,3,3}$ | 204,51,0 | 153,204,0 | 0,204,51 | 0,153,204 | 51,0,204 | 204,0,153 |
| 41 | $T_{3,4,1}$ | 255,128,51 | 179,255,51 | 51,255,128 | 51,179,255 | 128,51,255 | 255,51,179 |
| 42 | $T_{3,4,2}$ | 230,102,26 | 153,230,26 | 26,230,102 | 26,153,230 | 102,26,230 | 230,26,153 |
| 43 | $T_{3,4,3}$ | 204,77,0 | 128,204,0 | 0,204,77 | 0,128,204 | 77,0,204 | 204,0,128 |
| 44 | $T_{3,5,1}$ | 255,153,51 | 153,255,51 | 51,255,153 | 51,153,255 | 153,51,255 | 255,51,153 |
| 45 | $T_{3,5,2}$ | 230,128,26 | 128,230,26 | 26,230,128 | 26,128,230 | 128,26,230 | 230,26,128 |
| 46 | $T_{3,5,3}$ | 204,102,0 | 102,204,0 | 0,204,102 | 0,102,204 | 102,0,204 | 204,0,102 |
| 47 | $T_{3,6,1}$ | 255,179,51 | 128,255,51 | 51,255,179 | 51,128,255 | 179,51,255 | 255,51,128 |
| 48 | $T_{3,6,2}$ | 230,153,26 | 102,230,26 | 26,230,153 | 26,102,230 | 153,26,230 | 230,26,102 |
| 49 | $T_{3,6,3}$ | 204,128,0 | 77,204,0 | 0,204,128 | 0,77,204 | 128,0,204 | 204,0,77 |
| 50 | $T_{3,7,1}$ | 255,204,51 | 102,255,51 | 51,255,204 | 51,101255 | 204,51,255 | 255,51,102 |
| 51 | $T_{3,7,2}$ | 230,179,26 | 77,230,26 | 26,230,179 | 26,77,230 | 179,26,230 | 230,26,77 |
| 52 | $T_{3,7,3}$ | 204,153,0 | 51,204,0 | 0,204,153 | 0,51,204 | 153,0,204 | 204,0,51 |
| 53 | $T_{3,8,1}$ | 255,230,51 | 77,255,51 | 51,255,230 | 51,77,255 | 230,51,255 | 255,51,77 |
| 54 | $T_{3,8,2}$ | 230,204,26 | 51,230,26 | 26,230,204 | 26,51,230 | 204,26,230 | 230,26,51 |
| 55 | $T_{3,8,3}$ | 204,179,0 | 26,204,0 | 0,204,179 | 0,26,204 | 179,0,204 | 204,0,26 |
| 56 | $T_{3,9,1}$ | 255,255,51 | 51,255,51 | 51,255,255 | 51,51,255 | 255,51,255 | 255,51,51 |
| 57 | $T_{3,9,2}$ | 230,230,26 | 26,230,26 | 26,230,230 | 26,26,230 | 230,26,230 | 230,26,26 |
| 58 | $T_{3,9,3}$ | 204,204,0 | 0,204,0 | 0,204,204 | 0,0,204 | 204,0,204 | 204,0,0 |
| 59 | $T_{4,1,1}$ | 255,77,77 | 255,255,77 | 77,255,77 | 77,255,255 | 77,77,255 | 255,77,255 |
| 60 | $T_{4,1,2}$ | 230,51,51 | 230,230,51 | 51,230,51 | 51,230,230 | 51,51,230 | 230,51,230 |
| 61 | $T_{4,1,3}$ | 204,26,26 | 204,204,26 | 26,204,26 | 26,204,204 | 26,26,204 | 204,26,204 |
| 62 | $T_{4,1,4}$ | 179,0,0 | 179,179,0 | 0,179,0 | 0,179,179 | 0,0,179 | 179,0,179 |
| 63 | $T_{4,2,1}$ | 255,102,77 | 230,255,77 | 77,255,102 | 77,230,255 | 102,77,255 | 255,77,230 |
| 64 | $T_{4,2,2}$ | 230,77,51 | 204,230,51 | 51,230,77 | 51,204,230 | 77,51,230 | 230,51,204 |
| 65 | $T_{4,2,3}$ | 204,51,26 | 179,204,26 | 26,204,51 | 26,179,204 | 51,26,204 | 204,26,179 |
| 66 | $T_{4,2,4}$ | 179,26,0 | 153,179,0 | 0,179,26 | 0,153,179 | 26,0,179 | 179,0,153 |
| 67 | $T_{4,3,1}$ | 255,128,77 | 204,255,77 | 77,255,128 | 77,204,255 | 128,77,255 | 255,77,204 |
| 68 | $T_{4,3,2}$ | 230,102,51 | 179,230,51 | 51,230,102 | 51,179,230 | 102,51,230 | 230,51,179 |
| 69 | $T_{4,3,3}$ | 204,77,26 | 153,204,26 | 26,204,77 | 26,153,204 | 77,26,204 | 204,26,153 |
| 70 | $T_{4,3,4}$ | 179,51,0 | 128,179,0 | 0,179,51 | 0,128,179 | 51,0,179 | 179,0,128 |
| 71 | $T_{4,4,1}$ | 255,153,77 | 179,255,77 | 77,255,153 | 77,179,255 | 153,77,255 | 255,77,179 |
| 72 | $T_{4,4,2}$ | 230,128,51 | 153,230,51 | 51,230,128 | 51,153,230 | 128,51,230 | 230,51,153 |
| 73 | $T_{4,4,3}$ | 204,102,26 | 128,204,26 | 26,204,102 | 26,128,204 | 102,26,204 | 204,26,128 |
| 74 | $T_{4,4,4}$ | 179,77,0 | 102,179,0 | 0,179,77 | 0,102,179 | 77,0,179 | 179,0,102 |
| 75 | $T_{4,5,1}$ | 255,179,77 | 153,255,77 | 77,255,179 | 77,153,255 | 179,77,255 | 255,77,153 |
| 76 | $T_{4,5,2}$ | 230,153,51 | 128,230,51 | 51,230,153 | 51,128,230 | 153,51,230 | 230,51,128 |
| 77 | $T_{4,5,3}$ | 204,128,26 | 102,204,26 | 26,204,128 | 26,102,204 | 128,26,204 | 204,26,102 |
| 78 | $T_{4,5,4}$ | 179,102,0 | 77,179,0 | 0,179,102 | 0,77,179 | 102,0,179 | 179,0,77 |
| 79 | $T_{4,6,1}$ | 255,204,77 | 128,255,77 | 77,255,204 | 77,128,255 | 204,77,255 | 255,77,128 |
| 80 | $T_{4,6,2}$ | 230,179,51 | 102,230,51 | 51,230,179 | 51,102,230 | 179,51,230 | 230,51,102 |
| 81 | $T_{4,6,3}$ | 204,153,26 | 77,204,26 | 26,204,153 | 26,77,204 | 153,26,204 | 204,26,77 |
| 82 | $T_{4,6,4}$ | 179,128,0 | 51,179,0 | 0,179,128 | 0,51,179 | 128,0,179 | 179,0,51 |
| 83 | $T_{4,7,1}$ | 255,230,77 | 102,255,77 | 77,255,230 | 77,102,255 | 230,77,255 | 255,77,102 |
| 84 | $T_{4,7,2}$ | 230,204,51 | 77,230,51 | 51,230,204 | 51,77,230 | 204,51,230 | 230,51,77 |
| 85 | $T_{4,7,3}$ | 204,179,26 | 51,204,26 | 26,204,179 | 26,51,204 | 179,26,204 | 204,26,51 |
| 86 | $T_{4,7,4}$ | 179,153,0 | 26,179,0 | 0,179,153 | 0,26,179 | 153,0,179 | 179,0,26 |
| 87 | $T_{4,8,1}$ | 255,255,77 | 77,255,77 | 77,255,255 | 77,77,255 | 255,77,255 | 255,77,77 |
| 88 | $T_{4,8,2}$ | 230,230,51 | 51,230,51 | 51,230,230 | 51,51,230 | 230,51,230 | 230,51,51 |
| 89 | $T_{4,8,3}$ | 204,204,26 | 26,204,26 | 26,204,204 | 26,26,204 | 204,26,204 | 204,26,26 |
| 90 | $T_{4,8,4}$ | 179,179,0 | 0,179,0 | 0,179,179 | 0,0,179 | 179,0,179 | 179,0,0 |
| 91 | $T_{5,1,1}$ | 255,102,102 | 255,255,102 | 102,255,102 | 102,255,255 | 102,102,255 | 255,102,255 |
| 92 | $T_{5,1,2}$ | 230,77,77 | 230,230,77 | 77,230,77 | 77,230,230 | 77,77,230 | 230,77,230 |
| 93 | $T_{5,1,3}$ | 204,51,51 | 204,204,51 | 51,204,51 | 51,204,204 | 51,51,204 | 204,51,204 |
| 94 | $T_{5,1,4}$ | 179,26,26 | 179,179,26 | 26,179,26 | 26,179,179 | 26,26,179 | 179,26,179 |
| 95 | $T_{5,1,5}$ | 153,0,0 | 153,153,0 | 0,153,0 | 0,153,153 | 0,0,153 | 153,0,153 |
| 96 | $T_{5,2,1}$ | 255,128,102 | 230,255,102 | 102,255,128 | 102,230,255 | 128,102,255 | 255,102,230 |
| 97 | $T_{5,2,2}$ | 230,102,77 | 204,230,77 | 77,230,102 | 77,204,230 | 102,77,230 | 230,77,204 |
| 98 | $T_{5,2,3}$ | 204,77,51 | 179,204,51 | 51,204,77 | 51,179,204 | 77,51,204 | 204,51,179 |
| 99 | $T_{5,2,4}$ | 179,51,26 | 153,179,26 | 26,179,51 | 26,153,179 | 51,26,179 | 179,26,153 |
| 100 | $T_{5,2,5}$ | 153,26,0 | 128,153,0 | 0,153,26 | 0,128,153 | 26,0,153 | 153,0,128 |
| 101 | $T_{5,3,1}$ | 255,153,102 | 204,255,102 | 102,255,153 | 102,204,255 | 153,102,255 | 255,102,204 |
| 102 | $T_{5,3,2}$ | 230,128,77 | 179,230,77 | 77,230,128 | 77,179,230 | 128,77,230 | 230,77,179 |
| 103 | $T_{5,3,3}$ | 204,102,51 | 153,204,51 | 51,204,102 | 51,153,204 | 102,51,204 | 204,51,153 |
| 104 | $T_{5,3,4}$ | 179,77,26 | 128,179,26 | 26,179,77 | 26,128,179 | 77,26,179 | 179,26,128 |
| 105 | $T_{5,3,5}$ | 153,51,0 | 102,153,0 | 0,153,51 | 0,102,153 | 51,0,153 | 153,0,102 |
| 106 | $T_{5,4,1}$ | 255,179,102 | 179,255,102 | 102,255,179 | 102,179,255 | 179,102,255 | 255,102,179 |
| 107 | $T_{5,4,2}$ | 230,153,77 | 153,230,77 | 77,230,153 | 77,153,230 | 153,77,230 | 230,77,153 |
| 108 | $T_{5,4,3}$ | 204,128,51 | 128,204,51 | 51,204,128 | 51,128,204 | 128,51,204 | 204,51,128 |
| 109 | $T_{5,4,4}$ | 179,102,26 | 102,179,26 | 26,179,102 | 26,102,179 | 102,26,179 | 179,26,102 |
| 110 | $T_{5,4,5}$ | 153,77,0 | 77,153,0 | 0,153,77 | 0,77,153 | 77,0,153 | 153,0,77 |
| 111 | $T_{5,5,1}$ | 255,204,102 | 153,255,102 | 102,255,204 | 102,153,255 | 204,102,255 | 255,102,153 |
| 112 | $T_{5,5,2}$ | 230,179,77 | 128,230,77 | 77,230,179 | 77,128,230 | 179,77,230 | 230,77,128 |

TABLE 8-continued

| No. | mesh coordinates | #$O_1O_2AB$ | #$O_1O_2BC$ | #$O_1O_2CD$ | #$O_1O_2DE$ | #$O_1O_2EF$ | #$O_1O_2FA$ |
|---|---|---|---|---|---|---|---|
| 113 | $T_{5,5,3}$ | 204,153,51 | 102,204,51 | 51,204,153 | 51,102,204 | 153,51,204 | 204,51,102 |
| 114 | $T_{5,5,4}$ | 179,128,26 | 77,179,26 | 26,179,128 | 26,77,179 | 128,26,179 | 179,26,77 |
| 115 | $T_{5,5,5}$ | 153,102,0 | 51,153,0 | 0,153,102 | 0,51,153 | 102,0,153 | 153,0,51 |
| 116 | $T_{5,6,1}$ | 255,230,102 | 128,255,102 | 102,255,230 | 102,128,255 | 230,102,255 | 255,102,128 |
| 117 | $T_{5,6,2}$ | 230,204,77 | 102,230,77 | 77,230,204 | 77,102,230 | 204,77,230 | 230,77,102 |
| 118 | $T_{5,6,3}$ | 204,179,51 | 77,204,51 | 51,204,179 | 51,77,204 | 179,51,204 | 204,51,77 |
| 119 | $T_{5,6,4}$ | 179,153,26 | 51,179,26 | 26,179,153 | 26,51,179 | 153,26,179 | 179,26,51 |
| 120 | $T_{5,6,5}$ | 153,128,0 | 26,153,0 | 0,153,128 | 0,26,153 | 128,0,153 | 153,0,26 |
| 121 | $T_{5,7,1}$ | 255,255,102 | 102,255,102 | 102,255,255 | 102,102,255 | 255,102,255 | 255,102,102 |
| 122 | $T_{5,7,2}$ | 230,230,77 | 77,230,77 | 77,230,230 | 77,77,230 | 230,77,230 | 230,77,77 |
| 123 | $T_{5,7,3}$ | 204,204,51 | 51,204,51 | 51,204,204 | 51,51,204 | 204,51,204 | 204,51,51 |
| 124 | $T_{5,7,4}$ | 179,179,26 | 26,179,26 | 26,179,179 | 26,26,179 | 179,26,179 | 179,26,26 |
| 125 | $T_{5,7,5}$ | 153,153,0 | 0,153,0 | 0,153,153 | 0,0,153 | 153,0,153 | 153,0,0 |
| 126 | $T_{6,1,1}$ | 255,128,128 | 255,255,128 | 128,255,128 | 128,255,255 | 128,128,255 | 255,128,255 |
| 127 | $T_{6,1,2}$ | 230,102,102 | 230,230,102 | 102,230,102 | 102,230,230 | 102,102,230 | 230,102,230 |
| 128 | $T_{6,1,3}$ | 204,77,77 | 204,204,77 | 77,204,77 | 77,204,204 | 77,77,204 | 204,77,204 |
| 129 | $T_{6,1,4}$ | 179,51,51 | 179,179,51 | 51,179,51 | 51,179,179 | 51,51,179 | 179,51,179 |
| 130 | $T_{6,1,5}$ | 153,26,26 | 153,153,26 | 26,153,26 | 26,153,153 | 26,26,153 | 153,26,153 |
| 131 | $T_{6,1,6}$ | 128,0,0 | 128,128,0 | 0,128,0 | 0,128,128 | 0,0,128 | 128,0,128 |
| 132 | $T_{6,2,1}$ | 255,153,128 | 230,255,128 | 128,255,153 | 128,230,255 | 153,128,255 | 255,128,230 |
| 133 | $T_{6,2,2}$ | 230,128,102 | 204,230,102 | 102,230,128 | 102,204,230 | 128,102,230 | 230,102,204 |
| 134 | $T_{6,2,3}$ | 204,102,77 | 179,204,77 | 77,204,102 | 77,179,204 | 102,77,204 | 204,77,179 |
| 135 | $T_{6,2,4}$ | 179,77,51 | 153,179,51 | 51,179,77 | 51,153,179 | 77,51,179 | 179,51,153 |
| 136 | $T_{6,2,5}$ | 153,51,26 | 128,153,26 | 26,153,51 | 26,128,153 | 51,26,153 | 153,26,128 |
| 137 | $T_{6,2,6}$ | 128,26,0 | 102,128,0 | 0,128,26 | 0,102,128 | 26,0,128 | 128,0,102 |
| 138 | $T_{6,3,1}$ | 255,179,128 | 204,255,128 | 128,255,179 | 128,204,255 | 179,128,255 | 255,128,204 |
| 139 | $T_{6,3,2}$ | 230,153,102 | 179,230,102 | 102,230,153 | 102,179,230 | 153,102,230 | 230,102,179 |
| 140 | $T_{6,3,3}$ | 204,128,77 | 153,204,77 | 77,204,128 | 77,153,204 | 128,77,204 | 204,77,153 |
| 141 | $T_{6,3,4}$ | 179,102,51 | 128,179,51 | 51,179,102 | 51,128,179 | 102,51,179 | 179,51,128 |
| 142 | $T_{6,3,5}$ | 153,77,26 | 102,153,26 | 26,153,77 | 26,102,153 | 77,26,153 | 153,26,102 |
| 143 | $T_{6,3,6}$ | 128,51,0 | 77,128,0 | 0,128,51 | 0,77,128 | 51,0,128 | 128,0,77 |
| 144 | $T_{6,4,1}$ | 255,204,128 | 179,255,128 | 128,255,204 | 128,179,255 | 204,128,255 | 255,128,179 |
| 145 | $T_{6,4,2}$ | 230,179,102 | 153,230,102 | 102,230,179 | 102,153,230 | 179,102,230 | 230,102,153 |
| 146 | $T_{6,4,3}$ | 204,153,77 | 128,204,77 | 77,204,153 | 77,128,204 | 153,77,204 | 204,77,128 |
| 147 | $T_{6,4,4}$ | 179,128,51 | 102,179,51 | 51,179,128 | 51,102,179 | 128,51,179 | 179,51,102 |
| 148 | $T_{6,4,5}$ | 153,102,26 | 77,153,26 | 26,153,102 | 26,77,153 | 102,26,153 | 153,26,77 |
| 149 | $T_{6,4,6}$ | 128,77,0 | 51,128,0 | 0,128,77 | 0,51,128 | 77,0,128 | 128,0,51 |
| 150 | $T_{6,5,1}$ | 255,230,128 | 153,255,128 | 128,255,230 | 128,153,255 | 230,128,255 | 255,128,153 |
| 151 | $T_{6,5,2}$ | 230,204,102 | 128,230,102 | 102,230,204 | 102,128,230 | 204,102,230 | 230,102,128 |
| 152 | $T_{6,5,3}$ | 204,179,77 | 102,204,77 | 77,204,179 | 77,102,204 | 179,77,204 | 204,77,102 |
| 153 | $T_{6,5,4}$ | 179,153,51 | 77,179,51 | 51,179,153 | 51,77,179 | 153,51,179 | 179,51,77 |
| 154 | $T_{6,5,5}$ | 153,128,26 | 51,153,26 | 26,153,128 | 26,51,153 | 128,26,153 | 153,26,51 |
| 155 | $T_{6,5,6}$ | 128,102,0 | 26,128,0 | 0,128,102 | 0,26,128 | 102,0,128 | 128,0,26 |
| 156 | $T_{6,6,1}$ | 255,255,128 | 128,255,128 | 128,255,255 | 128,128,255 | 255,128,255 | 255,128,128 |
| 157 | $T_{6,6,2}$ | 230,230,102 | 102,230,102 | 102,230,230 | 102,102,230 | 230,102,230 | 230,102,102 |
| 158 | $T_{6,6,3}$ | 204,204,77 | 77,204,77 | 77,204,204 | 77,77,204 | 204,77,204 | 204,77,77 |
| 159 | $T_{6,6,4}$ | 179,179,51 | 51,179,51 | 51,179,179 | 51,51,179 | 179,51,179 | 179,51,51 |
| 160 | $T_{6,6,5}$ | 153,153,26 | 26,153,26 | 26,153,153 | 26,26,153 | 153,26,153 | 153,26,26 |
| 161 | $T_{6,6,6}$ | 128,128,0 | 0,128,0 | 0,128,128 | 0,0,128 | 128,0,128 | 128,0,0 |
| 162 | $T_{7,1,1}$ | 255,153,153 | 255,255,153 | 153,255,153 | 153,255,255 | 153,153,255 | 255,153,255 |
| 163 | $T_{7,1,2}$ | 230,128,128 | 230,230,128 | 128,230,128 | 128,230,230 | 128,128,230 | 230,128,230 |
| 164 | $T_{7,1,3}$ | 204,102,102 | 204,204,102 | 102,204,102 | 102,204,204 | 102,102,204 | 204,102,204 |
| 165 | $T_{7,1,4}$ | 179,77,77 | 179,179,77 | 77,179,77 | 77,179,179 | 77,77,179 | 179,77,179 |
| 166 | $T_{7,1,5}$ | 153,51,51 | 153,153,51 | 51,153,51 | 51,153,153 | 51,51,153 | 153,51,153 |
| 167 | $T_{7,1,6}$ | 128,26,26 | 128,128,26 | 26,128,26 | 26,128,128 | 26,26,128 | 128,26,128 |
| 168 | $T_{7,1,7}$ | 102,0,0 | 102,102,0 | 0,102,0 | 0,102,102 | 0,0,102 | 102,0,102 |
| 169 | $T_{7,2,1}$ | 255,179,153 | 230,255,153 | 153,255,179 | 153,230,255 | 179,153,255 | 255,153,230 |
| 170 | $T_{7,2,2}$ | 230,153,128 | 204,230,128 | 128,230,153 | 128,204,230 | 153,128,230 | 230,128,204 |
| 171 | $T_{7,2,3}$ | 204,128,102 | 179,204,102 | 102,204,128 | 102,179,204 | 128,102,204 | 204,102,179 |
| 172 | $T_{7,2,4}$ | 179,102,77 | 153,179,77 | 77,179,102 | 77,153,179 | 102,77,179 | 179,77,153 |
| 173 | $T_{7,2,5}$ | 153,77,51 | 128,153,51 | 51,153,77 | 51,128,153 | 77,51,153 | 153,51,128 |
| 174 | $T_{7,2,6}$ | 128,51,26 | 102,128,26 | 26,128,51 | 26,102,128 | 51,26,128 | 128,26,102 |
| 175 | $T_{7,2,7}$ | 102,26,0 | 77,102,0 | 0,102,26 | 0,77,102 | 26,0,102 | 102,0,77 |
| 176 | $T_{7,3,1}$ | 255,204,153 | 204,255,153 | 153,255,204 | 153,204,255 | 204,153,255 | 255,153,204 |
| 177 | $T_{7,3,2}$ | 230,179,128 | 179,230,128 | 128,230,179 | 128,179,230 | 179,128,230 | 230,128,179 |
| 178 | $T_{7,3,3}$ | 204,153,102 | 153,204,102 | 102,204,153 | 102,153,204 | 153,102,204 | 204,102,153 |
| 179 | $T_{7,3,4}$ | 179,128,77 | 128,179,77 | 77,179,128 | 77,128,179 | 128,77,179 | 179,77,128 |
| 180 | $T_{7,3,5}$ | 153,102,51 | 102,153,51 | 51,153,102 | 51,102,153 | 102,51,153 | 153,51,102 |
| 181 | $T_{7,3,6}$ | 128,77,26 | 77,128,26 | 26,128,77 | 26,77,128 | 77,26,128 | 128,26,77 |
| 182 | $T_{7,3,7}$ | 102,51,0 | 51,102,0 | 0,102,51 | 0,51,102 | 51,0,102 | 102,0,51 |
| 183 | $T_{7,4,1}$ | 255,230,153 | 179,255,153 | 153,255,230 | 153,179,255 | 230,153,255 | 255,153,179 |
| 184 | $T_{7,4,2}$ | 230,204,128 | 153,230,128 | 128,230,204 | 128,153,230 | 204,128,230 | 230,128,153 |
| 185 | $T_{7,4,3}$ | 204,179,102 | 128,204,102 | 102,204,179 | 102,128,204 | 179,102,204 | 204,102,128 |
| 186 | $T_{7,4,4}$ | 179,153,77 | 102,179,77 | 77,179,153 | 77,102,179 | 153,77,179 | 179,77,102 |
| 187 | $T_{7,4,5}$ | 153,128,51 | 77,153,51 | 51,153,128 | 51,77,153 | 128,51,153 | 153,51,77 |
| 188 | $T_{7,4,6}$ | 128,102,26 | 51,128,26 | 26,128,102 | 26,51,128 | 102,26,128 | 128,26,51 |

TABLE 8-continued

| | | RGB of color of mesh point on each tetrahedron in color space | | | | | |
|---|---|---|---|---|---|---|---|
| No. | mesh coordinates | #$\overline{O_1O_2AB}$ | #$\overline{O_1O_2BC}$ | #$\overline{O_1O_2CD}$ | #$\overline{O_1O_2DE}$ | #$\overline{O_1O_2EF}$ | #$\overline{O_1O_2FA}$ |
| 189 | $T_{7,4,7}$ | 102,77,0 | 26,102,0 | 0,102,77 | 0,26,102 | 77,0,102 | 102,0,26 |
| 190 | $T_{7,5,1}$ | 255,255,153 | 153,255,153 | 153,255,255 | 153,153,255 | 255,153,255 | 255,153,153 |
| 191 | $T_{7,5,2}$ | 230,230,128 | 128,230,128 | 128,230,230 | 128,128,230 | 230,128,230 | 230,128,128 |
| 192 | $T_{7,5,3}$ | 204,204,102 | 102,204,102 | 102,204,204 | 102,102,204 | 204,102,204 | 204,102,102 |
| 193 | $T_{7,5,4}$ | 179,179,77 | 77,179,77 | 77,179,179 | 77,77,179 | 179,77,179 | 179,77,77 |
| 194 | $T_{7,5,5}$ | 153,153,51 | 51,153,51 | 51,153,153 | 51,51,153 | 153,51,153 | 153,51,51 |
| 195 | $T_{7,5,6}$ | 128,128,26 | 26,128,26 | 26,128,128 | 26,26,128 | 128,26,128 | 128,26,26 |
| 196 | $T_{7,5,7}$ | 102,102,0 | 0,102,0 | 0,102,102 | 0,0,102 | 102,0,102 | 102,0,0 |
| 197 | $T_{8,1,1}$ | 255,179,179 | 255,255,179 | 179,255,179 | 179,255,255 | 179,179,255 | 255,179,255 |
| 198 | $T_{8,1,2}$ | 230,153,153 | 230,230,153 | 153,230,153 | 153,230,230 | 153,153,230 | 230,153,230 |
| 199 | $T_{8,1,3}$ | 204,128,128 | 204,204,128 | 128,204,128 | 128,204,204 | 128,128,204 | 204,128,204 |
| 200 | $T_{8,1,4}$ | 179,102,102 | 179,179,102 | 102,179,102 | 102,179,179 | 102,102,179 | 179,102,179 |
| 201 | $T_{8,1,5}$ | 153,77,77 | 153,153,77 | 77,153,77 | 77,153,153 | 77,77,153 | 153,77,153 |
| 202 | $T_{8,1,6}$ | 128,51,51 | 128,128,51 | 51,128,51 | 51,128,128 | 51,51,128 | 128,51,128 |
| 203 | $T_{8,1,7}$ | 102,26,26 | 102,102,26 | 26,102,26 | 26,102,102 | 26,26,102 | 102,26,102 |
| 204 | $T_{8,1,8}$ | 77,0,0 | 77,77,0 | 0,77,0 | 0,77,77 | 0,0,77 | 77,0,77 |
| 205 | $T_{8,2,1}$ | 255,204,179 | 230,255,179 | 179,255,204 | 179,230,255 | 204,179,255 | 255,179,230 |
| 206 | $T_{8,2,2}$ | 230,179,153 | 204,230,153 | 153,230,179 | 153,204,230 | 179,153,230 | 230,153,204 |
| 207 | $T_{8,2,3}$ | 204,153,128 | 179,204,128 | 128,204,153 | 128,179,204 | 153,128,204 | 204,128,179 |
| 208 | $T_{8,2,4}$ | 179,128,102 | 153,179,102 | 102,179,128 | 102 153,179 | 128,102,179 | 179,102,153 |
| 209 | $T_{8,2,5}$ | 153,102,77 | 128,153,77 | 77,153,102 | 77,128,153 | 102,77,153 | 153,77,128 |
| 210 | $T_{8,2,6}$ | 128,77,51 | 102,128,51 | 51,128,77 | 51,102,128 | 77,51,128 | 128,51,102 |
| 211 | $T_{8,2,7}$ | 102,51,26 | 77,102,26 | 26,102,51 | 26,77,102 | 51,26,102 | 102,26,77 |
| 212 | $T_{8,2,8}$ | 77,26,0 | 51,77,0 | 0,77,26 | 0,51,77 | 26,0,77 | 77,0,51 |
| 213 | $T_{8,3,1}$ | 255,230,179 | 204,255,179 | 179,255,230 | 179,204,255 | 230,179,255 | 255,179,204 |
| 214 | $T_{8,3,2}$ | 230,204,153 | 179,230,153 | 153,230,204 | 153,179,230 | 204,153,230 | 230,153,204 |
| 215 | $T_{8,3,3}$ | 204,179,128 | 153,204,128 | 128,204,179 | 128,153,204 | 179,128,204 | 204,128,153 |
| 216 | $T_{8,3,4}$ | 179,153,102 | 128,179,102 | 102,179,153 | 102,128,179 | 153,102,179 | 179,102,128 |
| 217 | $T_{8,3,5}$ | 153,128,77 | 102,153,77 | 77,153,128 | 77,102,153 | 128,77,153 | 153,77,102 |
| 218 | $T_{8,3,6}$ | 128,102,51 | 77,128,51 | 51,128,102 | 51,77,128 | 102,51,128 | 128,51,77 |
| 219 | $T_{8,3,7}$ | 102,77,26 | 51,102,26 | 26,102,77 | 26,51,102 | 77,26,102 | 102,26,51 |
| 220 | $T_{8,3,8}$ | 77,51,0 | 26,77,0 | 0,77,51 | 0,26,77 | 51,0,77 | 77,0,26 |
| 221 | $T_{8,4,1}$ | 255,255 179 | 179,255,179 | 179,255,255 | 179,179,255 | 255,179,255 | 255,179,179 |
| 222 | $T_{8,4,2}$ | 230,230,153 | 153,230,153 | 153,230,230 | 153,153,230 | 230,153,230 | 230,153,153 |
| 223 | $T_{8,4,3}$ | 204,204,128 | 128,204,128 | 128,204,204 | 128,128,204 | 204,128,204 | 204,128,128 |
| 224 | $T_{8,4,4}$ | 179,179,102 | 102,179,102 | 102,179,179 | 102,102,179 | 179,102,179 | 179,102,102 |
| 225 | $T_{8,4,5}$ | 153,153,77 | 77,153,77 | 77,153,153 | 77,77,153 | 153,77,153 | 153,77,77 |
| 226 | $T_{8,4,6}$ | 128,128,51 | 51,128,51 | 51,128,128 | 51,51,128 | 128,51,128 | 128,51,51 |
| 227 | $T_{8,4,7}$ | 102,102,26 | 26,102,26 | 26,102,102 | 26,26,102 | 102,26,102 | 102,26,26 |
| 228 | $T_{8,4,8}$ | 77,77,0 | 0,77,0 | 0,77,77 | 0,0,77 | 77,0,77 | 77,0,0 |
| 229 | $T_{9,1,1}$ | 255,204,204 | 255,255,204 | 204,255,204 | 204,255,255 | 204,204,255 | 255,204,255 |
| 230 | $T_{9,1,2}$ | 230,179,179 | 230,230,179 | 179,230,179 | 179,230,230 | 179,179,230 | 230,179,230 |
| 231 | $T_{9,1,3}$ | 204,153,153 | 204,204,153 | 153,204,153 | 153,204,204 | 153,153,204 | 204,153,204 |
| 232 | $T_{9,1,4}$ | 179,128,128 | 179,179,128 | 128,179,128 | 128,179,179 | 128,128,179 | 179,128,179 |
| 233 | $T_{9,1,5}$ | 153,102,102 | 153,153,102 | 102,153,102 | 102,153,153 | 102,102,153 | 153,102,153 |
| 234 | $T_{9,1,6}$ | 128,77,77 | 128,128,77 | 77,128,77 | 77,128,128 | 77,77,128 | 128,77,128 |
| 235 | $T_{9,1,7}$ | 102,51,51 | 102,102,51 | 51,102,51 | 51,102,102 | 51,51,102 | 102,51,102 |
| 236 | $T_{9,1,8}$ | 77,26,26 | 77,77,26 | 26,77,26 | 26,77,77 | 26,26,77 | 77,26,77 |
| 237 | $T_{9,1,9}$ | 51,0,0 | 51,51,0 | 0,51,0 | 0,51,51 | 0,0,51 | 51,0,51 |
| 238 | $T_{9,2,1}$ | 255,230,204 | 230,255,204 | 204,255,230 | 204,230,255 | 230,204,255 | 255,204,230 |
| 239 | $T_{9,2,2}$ | 230,204,179 | 204,230,179 | 179,230,204 | 179,204,230 | 204,179,230 | 230,179,204 |
| 240 | $T_{9,2,3}$ | 204,179,153 | 179,204,153 | 153,204,179 | 153,179,204 | 179,153,204 | 204,153,179 |
| 241 | $T_{9,2,4}$ | 179,153,128 | 153,179,128 | 128,179,153 | 128,153,179 | 153,128,179 | 179,128,153 |
| 242 | $T_{9,2,5}$ | 153,128,102 | 128,153,102 | 102,153,128 | 102,128,153 | 128,102,153 | 153,102,128 |
| 243 | $T_{9,2,6}$ | 128,102,77 | 102,128,77 | 77,128,102 | 77,102,128 | 102,77,128 | 128,77,102 |
| 244 | $T_{9,2,7}$ | 102,77,51 | 77,102,51 | 51,102,77 | 51,77,102 | 77,51,102 | 102,51,77 |
| 245 | $T_{9,2,8}$ | 77,51,26 | 51,77,26 | 26,77,51 | 26,51,77 | 51,26,77 | 77,26,51 |
| 246 | $T_{9,2,9}$ | 51,26,0 | 26,51,0 | 0,51,26 | 0,26,51 | 26,0,51 | 51,0,26 |
| 247 | $T_{9,3,1}$ | 255,255,204 | 204,255,204 | 204,255,255 | 204,204,255 | 255,204,255 | 255,204,204 |
| 248 | $T_{9,3,2}$ | 230,230,179 | 179,230,179 | 179,230,230 | 179,179,230 | 230,179,230 | 230,179,179 |
| 249 | $T_{9,3,3}$ | 204,204,153 | 153,204,153 | 153,204,204 | 153,153,204 | 204,153,204 | 204,153,153 |
| 250 | $T_{9,3,4}$ | 179,179,128 | 128,179,128 | 128,179,179 | 128,128,179 | 179,128,179 | 179,128,128 |
| 251 | $T_{9,3,5}$ | 153,153,102 | 102,153,102 | 102,153,153 | 102,102,153 | 153,102,153 | 153,102,102 |
| 252 | $T_{9,3,6}$ | 128,128,77 | 77,128,77 | 77,128,128 | 77,77,128 | 128,77,128 | 128,77,77 |
| 253 | $T_{9,3,7}$ | 102,102,51 | 51,102,51 | 51,102,102 | 51,51,102 | 102,51,102 | 102,51,51 |
| 254 | $T_{9,3,8}$ | 77,77,26 | 26,77,26 | 26,77,77 | 26,26,77 | 77,26,77 | 77,26,26 |
| 255 | $T_{9,3,9}$ | 51,51,0 | 0,51,0 | 0,51,51 | 0,0,51 | 51,0,51 | 51,0,0 |
| 256 | $T_{10,1,1}$ | 255,230,230 | 255,255,230 | 230,255,230 | 230,255,255 | 230,230,255 | 255,230,255 |
| 257 | $T_{10,1,2}$ | 230,204,204 | 230,230,204 | 204,230,204 | 204,230,230 | 204,204,230 | 230,204,230 |
| 258 | $T_{10,1,3}$ | 204,179,179 | 204,204,179 | 179,204,179 | 179,204,204 | 179,179,204 | 204,179,204 |
| 259 | $T_{10,1,4}$ | 179,153,153 | 179,179,153 | 153,179,153 | 153,179,179 | 153,153,179 | 179,153,179 |
| 260 | $T_{10,1,5}$ | 153,128,128 | 153,153,128 | 128,153,128 | 128,153,153 | 128,128,153 | 153,128,153 |
| 261 | $T_{10,1,6}$ | 128,102,102 | 128,128,102 | 102,128,102 | 102,128,128 | 102,102,128 | 128,102,128 |
| 262 | $T_{10,1,7}$ | 102,77,77 | 102,102,77 | 77,102,77 | 77,102,102 | 77,77,102 | 102,77,102 |
| 263 | $T_{10,1,8}$ | 77,51,51 | 77,77,51 | 51,77,51 | 51,77,77 | 51,51,77 | 77,51,77 |
| 264 | $T_{10,1,9}$ | 51,26,26 | 51,51,26 | 26,51,26 | 26,51,51 | 26,26,51 | 51,26,51 |

TABLE 8-continued

| mesh | | RGB of color of mesh point on each tetrahedron in color space | | | | | |
|---|---|---|---|---|---|---|---|
| No. | coordinates | #$O_1O_2AB$ | #$O_1O_2BC$ | #$O_1O_2CD$ | #$O_1O_2DE$ | #$O_1O_2EF$ | #$O_1O_2FA$ |
| 265 | $T_{10,1,10}$ | 26,0,0 | 26,26,0 | 0,26,0 | 0,26,26 | 0,0,26 | 26,0,26 |
| 266 | $T_{10,2,1}$ | 255,255,230 | 230,255,230 | 230,255,255 | 230,230,255 | 255,230,255 | 255,230,230 |
| 267 | $T_{10,2,2}$ | 230,230,204 | 204,230,204 | 204,230,230 | 204,204,230 | 230,204,230 | 230,204,204 |
| 268 | $T_{10,2,3}$ | 204,204,179 | 179,204,179 | 179,204,204 | 179,179,204 | 204,179,204 | 204,179,179 |
| 269 | $T_{10,2,4}$ | 179,179,153 | 153,179,153 | 153,179,179 | 153,153,179 | 179,153,179 | 179,153,153 |
| 270 | $T_{10,2,5}$ | 153,153,128 | 128,153,128 | 128,153,153 | 128,128,153 | 153,128,153 | 153,128,128 |
| 271 | $T_{10,2,6}$ | 128,128 102 | 102,128,102 | 102,128,128 | 102,102,128 | 128,102,128 | 128,102,102 |
| 272 | $T_{10,2,7}$ | 102,102,77 | 77,102,77 | 77,102,102 | 77,77,102 | 102,77,102 | 102,77,77 |
| 273 | $T_{10,2,8}$ | 77,77,51 | 51,77,51 | 51,77,77 | 51,51,77 | 77,51,77 | 77,51,51 |
| 274 | $T_{10,2,9}$ | 51,51,26 | 26,51,26 | 26,51,51 | 26,26,51 | 51,26,51 | 51,26,26 |
| 275 | $T_{10,2,10}$ | 26,26,0 | 0,26,0 | 0,26,26 | 0,0,26 | 26,0,26 | 26,0,0 |
| 276 | $T_{11,1,1}$ | 255,255,255 | 255,255,255 | 255,255,255 | 255,255,255 | 255,255,255 | 255,255,255 |
| 277 | $T_{11,1,2}$ | 230,230,230 | 230,230,230 | 230,230,230 | 230,230,230 | 230,230,230 | 230,230,230 |
| 278 | $T_{11,1,3}$ | 204,204,204 | 204,204,204 | 204,204,204 | 204,204,204 | 204,204,204 | 204,204,204 |
| 279 | $T_{11,1,4}$ | 179,179,179 | 179,179,179 | 179,179,179 | 179,179,179 | 179,179,179 | 179,179,179 |
| 280 | $T_{11,1,5}$ | 153,153,153 | 153,153,153 | 153,153,153 | 153,153,153 | 153,153,153 | 153,153,153 |
| 281 | $T_{11,1,6}$ | 128,128,128 | 128,128,128 | 128,128,128 | 128,128,128 | 128,128,128 | 128,128,128 |
| 282 | $T_{11,1,7}$ | 102,102,102 | 102,102,102 | 102,102,102 | 102,102,102 | 102,102,102 | 102,102,102 |
| 283 | $T_{11,1,8}$ | 77,77,77 | 77,77,77 | 77,77,77 | 77,77,77 | 77,77,77 | 77,77,77 |
| 284 | $T_{11,1,9}$ | 51,51,51 | 51,51,51 | 51,51,51 | 51,51,51 | 51,51,51 | 51,51,51 |
| 285 | $T_{11,1,10}$ | 26,26,26 | 26,26,26 | 26,26,26 | 26,26,26 | 26,26,26 | 26,26,26 |
| 286 | $T_{11,1,11}$ | 0,0,0 | 0,0,0 | 0,0,0 | 0,0,0 | 0,0,0 | 0,0,0 |

The above solutions design a method for constructing a meshed model and a discrete chromatography of eight primary color HSB color space. By a meshed digital model and a discrete algorithm of color space, the color value and the color distribution in any point, line, surface and space area in the HSB color space can be quickly obtained based on color values of eight primary colors and coordinate values of mesh points in the HSB color space, thereby realizing the full color gamut discrete chromatography of the HSB color space, realizing the visualization of the full color gamut of the color space, and improving the work efficiency of color matching. Moreover, the mesh points distributed in the full color gamut space directly show serialized binary color gradation chromatography obtained by performing discrete mixing on two groups of different primary colors randomly selected from eight-element primary color, serialized ternary color gradation chromatography obtained by performing discrete mixing on three groups of different primary colors randomly selected from eight-element primary color, serialized quaternary color gradation chromatography obtained by performing discrete mixing on four groups of different primary colors randomly selected from eight-element primary color, and serialized pentad color gradation chromatography obtained by performing discrete mixing on five groups of different primary colors randomly selected from eight-element primary color, which provides digital calculation method for deducing the change rule of mixed colors and innovating color design. Meanwhile, in the present invention, the color model can be constructed by optimizing the type and the number of multi-element primary color according to the actual application needs, and meshed scale of the model can be optimized according to the accuracy requirements of discrete chromatography. When constructing a color model, the HSB/HSV/HSL/HSI color models can be used, and the color models such as RGB, YUV/YIQ, CMYK, CIE can be also used. The present invention can be applied to the mixing of coloured light, the mixing of colorant, and the space juxtaposition mixing of color fiber.

The embodiments of the present invention have been described in detail above with reference to the drawings, but the present invention is not limited to the above embodiments. Within the scope of knowledge possessed by those skilled in the art, various changes can also be made without departing from the purpose of the present invention.

What is claimed is:

1. A method for constructing a meshed model a discrete chromatography of eight primary color HSB color space for realizing digital acquisition of colors in the eight-element primary color HSB color space based on mesh coordinates, comprising the following steps:

step A: constructing a 12-surface cone, selecting eight primary colors respectively corresponding to each vertex of the 12-surface cone, defining an upper end the 12-surface cone as a $1^{st}$ vertex and defining a lower end of the 12-surface cone as a $2^{nd}$ vertex, and for a middle periphery, defining vertices successively as a $3^{rd}$ vertex, a $4^{th}$ vertex, a $5^{th}$ vertex, a $6^{th}$ vertex, a $7^{th}$ vertex, and an $8^{th}$ vertex;

then for the 12-surface cone, obtaining a $1^{st}$ ridgeline, a $2^{nd}$ ridgeline, a $3^{rd}$ ridgeline, a $4^{th}$ ridgeline, a $5^{th}$ ridgeline, a $6^{th}$ ridgeline, a $7^{th}$ ridgeline, an $8^{th}$ ridgeline, a $9^{th}$ ridgeline, a $10^{th}$ ridgeline, an $11^{th}$ ridgeline, a $12^{th}$ ridgeline, a $13^{th}$ ridgeline, a $14^{th}$ ridgeline, a $15^{th}$ ridgeline, a $16^{th}$ ridgeline, a $17^{th}$ ridgeline, an $18^{th}$ ridgeline, a $19^{th}$ ridgeline; obtaining a $1^{st}$ triangle, a $2^{nd}$ triangle, a $3^{rd}$ triangle, a $4^{th}$ triangle, a $5^{th}$ triangle, a $6^{th}$ triangle, a $7^{th}$ triangle, an $8^{th}$ triangle, a $9^{th}$ triangle, a $10^{th}$ triangle, an $11^{th}$ triangle, a $12^{th}$ triangle, a $13^{th}$ triangle, a $14^{th}$ triangle, a $15^{th}$ triangle, a $16^{th}$ triangle, a $17^{th}$ triangle, an $18^{th}$ triangle, a $19^{th}$ triangle, a $20^{th}$ triangle; obtaining a $1^{st}$ tetrahedron, a $2^{nd}$ tetrahedron, a $3^{rd}$ tetrahedron, a $4^{th}$ tetrahedron, a $5^{th}$ tetrahedron, a $6^{th}$ tetrahedron; obtaining a $1^{st}$ hexahedron, a $2^{nd}$ hexahedron;

then proceeding to step B;

step B: for each ridgeline respectively, performing a digital isometric division between two endpoints on each ridgeline to obtain (n−1) mesh points and coordinate values of the (n−1) mesh points, obtaining an interpolation function with the coordinate values of the (n−1) mesh points as independent variables in combination with tristimulus values of primary color respectively corresponding to the two endpoints on each ridgeline, and obtaining tristimulus values of color of each mesh point of the (n−1) mesh points based on the coordinate values of the (n−1) mesh points; wherein, tristimulus values of color corresponding to each mesh point on each ridgeline are as follows:

$$r_i = \frac{n-i+1}{n}*R_\alpha + \frac{i-1}{n}*R_\beta$$

$$g_i = \frac{n-i+1}{n}*G_\alpha + \frac{i-1}{n}*G_\beta$$

$$b_i = \frac{n-i+1}{n}*B_\alpha + \frac{i-1}{n}*B_\beta$$

wherein, n is a first preset number of divisions, $i \in \{1, 2, \ldots, n, n+1\}$, $r_i, g_i, b_i$ denote the tristimulus values of color corresponding to each mesh point on each ridgeline, $R_\alpha, G_\alpha, B_\alpha$ denote tristimulus values of primary color α corresponding to a first endpoint on each ridgeline, and $R_\beta, G_\beta, B_\beta$ denote tristimulus values of primary color β corresponding to a second endpoint on each ridgeline;

for each triangle respectively, performing a mesh digital equal-part division in each triangle to obtain $n*(n+1)/2$ mesh points and coordinate values of the $n*(n+1)/2$ mesh points, obtaining an interpolation function with the coordinate values of the $n*(n+1)/2$ mesh points as independent variables in combination with tristimulus values of primary color each triangle, and obtaining tristimulus values of color of each mesh point of the $n*(n+1)/2$ mesh points based on the coordinate values of the $n*(n+1)/2$ mesh points; wherein, tristimulus values of color corresponding to each mesh point in each triangle are as follows:

$$r_{\Delta i,j} = \frac{n-i-j+2}{n}*R_\alpha + \frac{i-1}{n}*R_\beta + \frac{j-1}{n}*R_\gamma$$

$$g_{\Delta i,j} = \frac{n-i-j+2}{n}*G_\alpha + \frac{i-1}{n}*G_\beta + \frac{j-1}{n}*G_\gamma$$

$$b_{\Delta i,j} = \frac{n-i-j+2}{n}*B_\alpha + \frac{i-1}{n}*B_\beta + \frac{j-1}{n}*B_\gamma$$

wherein, $n*(n+1)/2$ is a second preset number of divisions, $i=1, 2, \ldots n-1, n, n+1$, $j=1, 2, \ldots n-1, n, n+1$, $i+j \leq (n+2)$, $r_{\Delta i,j}, g_{\Delta i,j}, b_{\Delta i,j}$ denote the tristimulus values of color corresponding to each mesh point in each triangle, $R_\alpha, G_\alpha, B_\alpha$ denote tristimulus values of primary color α corresponding to a first vertex of each triangle, $R_\beta, G_\beta, B_\beta$ denote tristimulus values of primary color β corresponding to a second vertex of each triangle, and $R_\gamma, G_\gamma, B_\gamma$ denote tristimulus values of primary color γ corresponding to a third vertex of each triangle;

for each tetrahedron respectively, performing a mesh digital equal-part division in each tetrahedron to obtain $$\sum_{i=1}^{n+1}[i*(i+1)/2]$$

mesh points and coordinate values of the $$\sum_{i=1}^{n+1}[i*(i+1)/2]$$

mesh points, obtaining an interpolation function with the coordinate values of the $$\sum_{i=1}^{n+1}[i*(i+1)/2]$$

mesh points as independent variables in combination with tristimulus values of primary color respectively corresponding to four vertices on each tetrahedron, and obtaining tristimulus values of color corresponding to each mesh point of the $$\sum_{i=1}^{n+1}[i*(i+1)/2]$$

mesh points based on the coordinate values of the $$\sum_{i=1}^{n+1}[i*(i+1)/2]$$

mesh points; wherein, tristimulus values of color corresponding to each mesh point in each tetrahedron are as follows:

$$r_{\sharp i,j,k} = \frac{n-i-j+2}{n}*R_\alpha + \frac{j-1}{n}*R_\beta + \frac{i-k}{n}*R_\gamma + \frac{k-1}{n}*R_\delta$$

$$g_{\sharp i,j,k} = \frac{n-i-j+2}{n}*G_\alpha + \frac{j-1}{n}*G_\beta + \frac{i-k}{n}*G_\gamma + \frac{k-1}{n}*G_\delta$$

$$b_{\sharp i,j,k} = \frac{n-i-j+2}{n}*B_\alpha + \frac{j-1}{n}*B_\beta + \frac{i-k}{n}*B_\gamma + \frac{k-1}{n}*B_\delta$$

wherein, $$\sum_{i=1}^{n+1}[i*(i+1)/2]$$

is a third preset number of divisions, $i \in \{1, 2, \ldots, n, n+1\}$, $j \in \{1, 2, \ldots, n, n+1\}$, $k \in \{1, 2, \ldots, n, n+1\}$, $i+j \leq (n+2)$, $i+k \leq (n+2)$, $k+j \leq (n+2)$, $r_{\sharp i,j,k}, g_{\sharp i,j,k}, b_{\sharp i,j,k}$ denote the tristimulus values of color corresponding to each mesh point in each tetrahedron, $R_\alpha, G_\alpha, B_\alpha$ denote tristimulus values of primary color α corresponding to a first vertex on each tetrahedron, $R_\beta, G_\beta, B_\beta$ denote tristimulus values of primary color β corresponding to a second vertex on each tetrahedron, $R_\gamma, G_\gamma, B_\gamma$ denote tristimulus values of primary color γ corresponding to a third vertex on each tetrahedron, and $R_\delta, G_\delta, B_\delta$ denote tristimulus values of primary color δ corresponding to a fourth vertex on each tetrahedron;

for each hexahedron respectively, performing a mesh digital equal-part division in each hexahedron to obtain $$\sum_{i=1}^{n+1}[i*(i+1)]$$

mesh points and coordinate values of the $$\sum_{i=1}^{n+1}[i*(i+1)]$$

mesh points, obtaining an interpolation function with the coordinate values of the $$\sum_{i=1}^{n+1}[i*(i+1)]$$

mesh points as independent variables in combination with tristimulus values of primary color respectively corresponding to five vertices on each hexahedron, and obtaining tristimulus values of color corresponding to each mesh point of the $$\sum_{i=1}^{n+1}[i*(i+1)]$$

mesh points based on the coordinate values of the $$\sum_{i=1}^{n+1}[i*(i+1)]$$

mesh points in each hexahedron are as follows:

$$r_{i,j,k,l} = \frac{n-i-j+2}{n}*R_\alpha + \frac{j-1}{n}*R_\beta + \frac{i-k}{n}*R_\gamma + \frac{k-1}{n}*R_\delta + \frac{l-1}{n}*R_\varepsilon$$

$$g_{i,j,k,l} = \frac{n-i-j+2}{n}*G_\alpha + \frac{j-1}{n}*G_\beta +$$
$$\frac{i-k}{n}*G_\gamma + \frac{k-1}{n}*G_\delta + \frac{l-1}{n}*G_\varepsilon$$

-continued $$b_{i,j,k,l} = \frac{n-i-j+2}{n}*B_\alpha + \frac{j-1}{n}*B_\beta +$$
$$\frac{i-k}{n}*B_\gamma + \frac{k-1}{n}*B_\delta + \frac{l-1}{n}*B_\varepsilon$$

wherein, $$\sum_{i=1}^{n+1}[i*(i+1)]$$

is a fourth preset number of divisions, $i \in \{1, 2, \ldots, n, n+1\}$, $j \in \{1, 2, \ldots, n, n+1\}$, $k \in \{1, 2, \ldots, n, n+1\}$, $l \in \{1, 2, \ldots, n, n+1\}$, $i+j \le (n+2)$, $i+k \le (n+2)$, $i+l \le (n+2)$, $j+k \le (n+2)$, $j+l \le (n+2)$, $k+l \le (n+2)$, i, j, k, l denote coordinates of hexahedron division mesh points, $r_{i,j,k,l}$, $g_{i,j,k,l}$, $b_{i,j,k,l}$ denote the tristimulus values of color corresponding to each mesh point in each hexahedron, $R_\alpha$, $G_\alpha$, $B_\alpha$ denote tristimulus values of primary color α corresponding to a first endpoint on each hexahedron, $R_\beta$, $G_\beta$, $B_\beta$ denote tristimulus values of primary color β corresponding to a second endpoint on each hexahedron, $R_\gamma$, $G_\gamma$, $B_\gamma$ denote tristimulus values of primary color γ corresponding to a third endpoint on each hexahedron, $R_\delta$, $G_\delta$, $B_\delta$ denote tristimulus values of primary color δ corresponding to a fourth endpoint on each hexahedron, and $R_\varepsilon$, $G_\varepsilon$, $B_\varepsilon$ denote tristimulus values of primary color ε corresponding to a fifth endpoint on each hexahedron;
then proceeding to step C;
step C: according to tristimulus values and mesh point coordinate values of the eight primary colors respectively corresponding to each vertex on the 12-surface cone, in each ridgeline, each triangle, each tetrahedron, and each hexahedron on the 12-surface cone, obtaining a discrete distribution function of the tristimulus values with the mesh point coordinate values as independent variables, so as to realize the construction of the meshed model and the discrete chromatography of eight-element primary color HSB color space; and
performing tone control, saturation control, and brightness control based on the mesh coordinates of the meshed model to provide colorants of multi-element primary color for full chromatography of colors and color mixtures.

2. The method of claim 1, wherein, the tristimulus values of the eight primary colors respectively corresponding to each vertex on the 12-surface cone are as follows:
the $3^{rd}$ vertex (255, 0, 0), the $4^{th}$ vertex (255, 255, 0), the $5^{th}$ vertex (0, 255, 0), the $6^{th}$ vertex (0, 255, 255), the $7^{th}$ vertex (0, 0, 255), the $8^{th}$ vertex (255, 0, 255), the $1^{st}$ vertex (255, 255, 255), the $2^{nd}$ vertex (0, 0, 0);
based on n=10, acquisition of discrete colors of eight primary color HSB color space is realized.

* * * * *